United States Patent
Brill et al.

(10) Patent No.: US 7,912,775 B1
(45) Date of Patent: Mar. 22, 2011

(54) LIQUIDITY ANALYSIS SYSTEM AND METHOD

(75) Inventors: Roger E. Brill, Mt. Prospect, IL (US); Jennifer L. Drake, Evanston, IL (US)

(73) Assignee: Archipelago Holdings, Inc., Chicago, IL (US)

( * ) Notice: Subject to any disclaimer, the term of this patent is extended or adjusted under 35 U.S.C. 154(b) by 500 days.

(21) Appl. No.: 11/122,498

(22) Filed: May 5, 2005

(51) Int. Cl.
*G06Q 40/00* (2006.01)

(52) U.S. Cl. ............ 705/36 R; 705/26; 705/35; 705/36; 705/37

(58) Field of Classification Search .................... 705/35, 705/36 R, 37, 26, 36
See application file for complete search history.

(56) References Cited

U.S. PATENT DOCUMENTS

| | | | |
|---|---|---|---|
| 5,101,353 A * | 3/1992 | Lupien et al. .................... 705/37 |
| 5,560,580 A | 10/1996 | Almoslino | |
| 5,845,266 A * | 12/1998 | Lupien et al. .............. 705/36 R |
| 5,905,974 A | 5/1999 | Fraser et al. | |
| 5,950,176 A | 9/1999 | Keiser et al. | |
| 6,012,046 A * | 1/2000 | Lupien et al. .............. 705/36 R |
| 6,098,051 A * | 8/2000 | Lupien et al. .............. 705/36 R |
| 6,278,982 B1 * | 8/2001 | Korhammer et al. ....... 705/36 R |
| 6,343,278 B1 | 1/2002 | Jain et al. | |
| 6,377,940 B2 * | 4/2002 | Tilfors et al. .................... 705/37 |
| 6,405,180 B2 | 6/2002 | Tilfors et al. | |
| 6,408,282 B1 | 6/2002 | Buiste | |
| 6,505,174 B1 * | 1/2003 | Keiser et al. ............... 705/36 R |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |
| 6,963,856 B2 | 11/2005 | Lutnick et al. | |
| 6,983,260 B2 | 1/2006 | Hummelgren | |
| 7,162,447 B1 * | 1/2007 | Cushing ......................... 705/37 |
| 7,162,448 B2 | 1/2007 | Madoff et al. | |
| 7,184,982 B1 | 2/2007 | Howorka et al. | |
| 7,197,483 B2 | 3/2007 | Brady et al. | |
| 7,209,896 B1 | 4/2007 | Serkin et al. | |
| 7,225,153 B2 * | 5/2007 | Lange ............................ 705/37 |
| 7,242,669 B2 | 7/2007 | Bundy et al. | |

(Continued)

FOREIGN PATENT DOCUMENTS

AU 2006/24483 2/2006

(Continued)

OTHER PUBLICATIONS

Charles R. Schnitzlein, Call and Continuous Trading Mechanisms Under Asymmetric Information: An Experimental Investigation, The Journal of Finance, vol. 51, No. 2, pp. 613-636, Jun. 1996.*

(Continued)

*Primary Examiner* — Kirsten S Apple
*Assistant Examiner* — B. Joan Amelunxen
(74) *Attorney, Agent, or Firm* — Milbank, Tweed, Hadley & McCloy LLP

(57) ABSTRACT

A liquidity analysis system and method are disclosed for monitoring, analyzing and reporting on liquidity generated in a market or in a market center. The reports generated by the liquidity engine may be used for many differing purposes, including analyzing the effectiveness of market makers, the proportionate re-distribution of market data fees or as the basis for a liquidity generation financial incentive program.

49 Claims, 17 Drawing Sheets

U.S. PATENT DOCUMENTS

| | | |
|---|---|---|
| 7,246,090 B1 | 7/2007 | Thomas |
| 7,246,093 B1 * | 7/2007 | Katz ............................. 705/37 |
| 7,249,077 B2 * | 7/2007 | Williams et al. ............... 705/35 |
| 7,249,086 B2 | 7/2007 | Bloom et al. |
| 7,356,498 B2 | 4/2008 | Kaminsky et al. |
| 7,383,220 B1 | 6/2008 | Keith |
| 7,401,046 B2 | 7/2008 | Hollerman et al. |
| 7,406,444 B2 * | 7/2008 | Eng et al. ....................... 705/37 |
| 7,430,533 B1 * | 9/2008 | Cushing .......................... 705/37 |
| 7,685,057 B2 | 10/2008 | Chiulli et al. |
| 7,467,110 B2 * | 12/2008 | Muller et al. ................... 705/37 |
| 7,647,264 B2 * | 1/2010 | Hatheway et al. ......... 705/36 R |
| 2001/0037284 A1 | 11/2001 | Finkelstein et al. |
| 2002/0010672 A1 | 1/2002 | Waelbroeck et al. |
| 2002/0010673 A1 * | 1/2002 | Muller et al. ................... 705/37 |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0120511 A1 | 8/2002 | Hanes |
| 2002/0128951 A1 * | 9/2002 | Kiron et al. .................... 705/37 |
| 2002/0128955 A1 | 9/2002 | Brady et al. |
| 2002/0128958 A1 | 9/2002 | Slone |
| 2002/0143676 A1 * | 10/2002 | Kiron et al. .................... 705/35 |
| 2002/0147670 A1 * | 10/2002 | Lange ............................. 705/35 |
| 2002/0161687 A1 | 10/2002 | Serkin et al. |
| 2002/0169703 A1 | 11/2002 | Lutnick et al. |
| 2002/0174046 A1 * | 11/2002 | Mistretta ......................... 705/36 |
| 2002/0184135 A1 | 12/2002 | Zakaria |
| 2002/0184136 A1 | 12/2002 | Cleary et al. |
| 2002/0198815 A1 | 12/2002 | Greifeld et al. |
| 2002/0198816 A1 * | 12/2002 | Gilbert et al. .................. 705/37 |
| 2003/0004851 A2 * | 1/2003 | Kiron et al. .................... 705/37 |
| 2003/0004858 A1 | 1/2003 | Schmitz et al. |
| 2003/0009400 A2 * | 1/2003 | Kiron et al. .................... 705/35 |
| 2003/0009412 A1 | 1/2003 | Furbush et al. |
| 2003/0009413 A1 | 1/2003 | Furbush et al. |
| 2003/0009414 A1 | 1/2003 | Furbush et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0083974 A1 | 5/2003 | Bunda |
| 2003/0093343 A1 * | 5/2003 | Huttenlocher et al. ......... 705/35 |
| 2003/0097328 A1 | 5/2003 | Lundberg et al. |
| 2003/0115131 A1 * | 6/2003 | Heaton et al. .................. 705/37 |
| 2003/0130920 A1 * | 7/2003 | Freund ............................ 705/35 |
| 2003/0130925 A1 | 7/2003 | Malitzis |
| 2003/0130926 A1 | 7/2003 | Moore et al. |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 * | 12/2003 | Salvadori et al. ............... 705/37 |
| 2004/0030630 A1 | 2/2004 | Tilfors et al. |
| 2004/0044610 A1 | 3/2004 | Fraser et al. |
| 2004/0059666 A1 | 3/2004 | Waelbroeck et al. |
| 2004/0088242 A1 * | 5/2004 | Ascher et al. ................... 705/37 |
| 2004/0143538 A1 | 7/2004 | Korhammer et al. |
| 2004/0143542 A1 | 7/2004 | Magill et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Chirquina |
| 2004/0236662 A1 | 11/2004 | Korhammer et al. |
| 2004/0236669 A1 | 11/2004 | Horst et al. |
| 2004/0243502 A1 * | 12/2004 | Slowik et al. ................... 705/37 |
| 2004/0254804 A1 | 12/2004 | Peterffy et al. |
| 2004/0254877 A1 | 12/2004 | Buckwalter et al. |
| 2004/0267655 A1 | 12/2004 | Davidowitz et al. |
| 2005/0010481 A1 * | 1/2005 | Lutnick et al. .................. 705/26 |
| 2005/0075963 A1 | 4/2005 | Balabon |
| 2005/0096999 A1 | 5/2005 | Newell et al. |
| 2005/0102218 A1 * | 5/2005 | Sargent et al. .................. 705/37 |
| 2005/0119964 A1 | 6/2005 | Brady et al. |
| 2005/0125316 A1 | 6/2005 | Levering et al. |
| 2005/0137962 A1 | 6/2005 | Penney et al. |
| 2005/0160024 A1 | 7/2005 | Soderborg et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0171895 A1 | 8/2005 | Howorka et al. |
| 2005/0197916 A1 | 9/2005 | Newell et al. |
| 2005/0222936 A1 | 10/2005 | Panariti et al. |
| 2005/0228739 A1 * | 10/2005 | Leibowitz ....................... 705/37 |
| 2005/0240510 A1 | 10/2005 | Schweickert et al. |
| 2005/0273407 A1 | 12/2005 | Black et al. |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020526 A1 | 1/2006 | Viner |
| 2006/0031157 A1 | 2/2006 | Gianakouros et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |
| 2006/0184444 A1 * | 8/2006 | McConaughy et al. ......... 705/37 |
| 2006/0206404 A1 | 9/2006 | Hatheway et al. |
| 2006/0206407 A1 | 9/2006 | Troxel, Jr. et al. |
| 2006/0235786 A1 * | 10/2006 | DiSalvo ........................... 705/37 |
| 2006/0253374 A1 | 11/2006 | Addock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 | 10/2007 | Couperler et al. |
| 2008/0040290 A1 | 2/2008 | Harris |
| 2010/0030704 A1 | 2/2010 | Griffin et al. |

FOREIGN PATENT DOCUMENTS

| | | |
|---|---|---|
| AU | 2006/244479 | 11/2006 |
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1 321 870 | 12/2001 |
| JP | 2008/510109 | 4/2008 |
| JP | 2008/510110 | 4/2008 |
| JP | 2008/510226 | 4/2008 |
| JP | 2008/510238 | 4/2008 |
| SG | 2007/166754 | 5/2006 |
| SG | 2007/166804 | 5/2006 |
| SG | 2007/166812 | 5/2006 |
| SG | 2007/16678 | 9/2006 |
| SG | 2007/166788 | 9/2006 |
| SG | 2007/166762 | 7/2007 |
| SG | 2007/166770 | 7/2007 |
| SG | 2007/166796 | 7/2007 |
| WO | WO 01/07039 | 2/2001 |
| WO | WO 01/22322 | 3/2001 |
| WO | WO 01/22339 | 3/2001 |
| WO | WO 01/52166 | 7/2001 |
| WO | WO 01/75733 | 10/2001 |
| WO | WO 01/90925 | 11/2001 |
| WO | WO 01/09008 | 1/2002 |
| WO | WO 2004/008296 | 1/2004 |

| | | |
|---|---|---|
| WO | WO 2005/010790 | 2/2005 |
| WO | WO 2005/036354 | 4/2005 |
| WO | 2006016683 | 5/2006 |
| WO | 2006016684 | 5/2006 |
| WO | 2006016685 | 5/2006 |
| WO | 2006016701 | 5/2006 |
| WO | 2006017249 | 5/2006 |
| WO | 2006017253 | 5/2006 |
| WO | 2006017296 | 5/2006 |
| WO | 2006036461 | 9/2006 |
| WO | 2006036878 | 9/2006 |
| WO | 2007016571 | 7/2007 |
| WO | 2007016572 | 7/2007 |
| WO | 2007016682 | 7/2007 |
| WO | 2007016718 | 7/2007 |
| WO | 2007016856 | 7/2007 |
| WO | 2007016857 | 7/2007 |
| WO | 2007024921 | 12/2007 |

OTHER PUBLICATIONS

Response to Final, Sep. 30, 2009 for U.S. Appl. No. 11/416,942.
Examiner Interview Summary Record, Mar. 31, 2009 for U.S. Appl. No. 11/416,943.
Nonfinal Rejection, Sep. 30, 2009 for U.S. Appl. No. 11/416,943.
NASDAQ Launches Liquidity Tracker, HighBeam Research, Dec. 5, 2002.
Response to Nonfinal, Sep. 29, 2009 for U.S. Appl. No. 11/634,020.
Response to Final, Oct. 19, 2009 for U.S. Appl. No. 11/416,913.
International Search Report, Oct. 14, 2009 for SG2007166754.
International Search Report, Oct. 2, 2009 for SG2007166812.
Nonfinal Rejection, Aug. 17, 2009 for U.S. Appl. No. 11/416,710.
Response to Nonfinal, Nov. 2, 2009 for U.S. Appl. No. 11/416,710.
Response to Final, Oct. 7, 2009 for U.S. Appl. No. 11/416,942.
Examiner Interview Summary, Oct. 14, 2009 for U.S. Appl. No. 11/416,942.
Nonfinal Rejection, Oct. 7, 2009 for U.S. Appl. No. 11/345,421.
Response to Nonfinal, Nov. 6, 2009 for 416,756.
U.S. Appl. No. 61/191,055.
U.S. Appl. No. 11/881,788.
U.S. Appl. No. 11/881,789.
U.S. Appl. No. 11/881,064.
U.S. Appl. No. 11/880,852.
U.S. Appl. No. 11/880,686.
U.S. Appl. No. 11/880,840.
U.S. Appl. No. 11/634,020.
U.S. Appl. No. 11/527,797.
U.S. Appl. No. 11/416,710.
U.S. Appl. No. 11/416,913.
U.S. Appl. No. 11/416,756.
U.S. Appl. No. 11/416,943.
U.S. Appl. No. 11/416,942.
U.S. Appl. No. 11/525,363.
U.S. Appl. No. 11/345,421.
U.S. Appl. No. 11/122,498.
U.S. Appl. No. 60/721,165.
U.S. Appl. No. 11/122,679.
U.S. Appl. No. 11/345,420.
International Search Report & Written Opinion, PCT/US07/16856, Nov. 10, 2008.
International Search Report for PCT/US06/16685, Sep. 17, 2007.
International Preliminary Report on Patentability, PCT/US2007/016572, Apr. 23, 2009.
International Preliminary Report on Patentability, PCT/US2007/024921, Jun. 18, 2009.
McKinnion, Julie M., Toldeo Ohio-Based Dana Corp. Could Lose NYSE Listing in Takeover Battle, The Blade, Aug. 3, 2003.
Young, Lee, W., International Search Report May 18, 2007, 4 pages.
Young, Lee, W., International Search Report Sep. 12, 2007, 6 pages.
Young, Lee, W., International Search Report Aug. 9, 2007, 6 pages.
Young, Lee, W., International Search Report Aug. 29, 2007, 7 pages.
Young, Lee, W., International Search Report Sep. 5, 2007, 8 pages.
Young, Lee, W., International Search Report Sep. 7, 2007, 5 pages.
Young, Lee, W., International Search Report Sep. 29, 2007, 6 pages.
Australian Patent Office Written Opinion & Search Report, mailed Dec. 1, 2008.
Australian Patent Office Written Opinion & Search Report, mailed Jan. 9, 2009.
Australian Patent Office Written Opinion & Search Report, mailed Feb. 13, 2009.
Austrian Patent Office Search Report and Written Opinion, mailed Mar. 6, 2009.
Austrian Patent Office Search Report and Written Opinion, mailed Mar. 13, 2009.
Notice of Allowance and Examiner's Amendment for 11/345,420.
Phlx Allows Floor Broker Crossing, Wall Street Letter, New York, Feb. 24, 2003, p. 1.
Anonymous, Rising tide lifts all boats in institutional equities, The Investment Dealers' digest: IDD, New York, Mar. 28, 1994, vol. 60, Iss. 13, p. 16, 5 pages.
Headstrong Buys assets of Elind Software Provider; Noticiasfinancieras, Miami Nov. 1, 2004, p. 1.
International Search Report, Mar. 20, 2008 for PCT/US2007/016718.
International Search Report, Jun. 17, 2008 for PCT/US2007/016682.
International Search Report, Sep. 18, 2008 for PCT/US2007/016856.
International Search Report, Nov. 10, 2008 for PCT/US2007/016856.
International Search Report, Sep. 5, 2008 for PCT/US2007/016857.
International Search Report, Jul. 2, 2008 for PCT/US2007/016572.
Examiner Interview, May 4, 2009 for U.S. Appl. No. 11/122,679.
Response to Non-Final, Jun. 17, 2009 for U.S. Appl. No. 11/122,679.
Non-Final Rejection, Dec. 9, 2008 for U.S. Appl. No. 11/345,420.
Response to Non-Final, Mar. 16, 2009 for U.S. Appl. No. 11/345,420.
Notice of Allowance, Jul. 23, 2009 for U.S. Appl. No. 11/345,420.
Non-Final Rejection, Feb. 12, 2008 for U.S. Appl. No. 11/122,498.
Response to Non-Final, Aug. 14, 2008 for U.S. Appl. No. 11/122,498.
Final Rejection, Sep. 19, 2008 for U.S. Appl. No. 11/122,498.
Response to Final, Jan. 9, 2009 for U.S. Appl. No. 11/122,498.
Non-Final Rejection, Apr. 15, 2009 for U.S. Appl. No. 11/122,498.
Non-Final Rejection, Jun. 27, 2008 for U.S. Appl. No. 11/345,421.
Response to Non-Final, Sep. 22, 2008 for U.S. Appl. No. 11/345,421.
Final Rejection, Jan. 26, 2009 for U.S. Appl. No. 11/345,421.
Response to Final, May 22, 2009 for U.S. Appl. No. 11/345,421.
Non-Final Rejection, Sep. 30, 2008 for U.S. Appl. No. 11/416,942.
Response to Non-Final, Jan. 12, 2009 for U.S. Appl. No. 11/416,942.
Final Rejection, Apr. 23, 2009 for U.S. Appl. No. 11/416,942.
Notice to Applicant re: Informal Response to Non-Final, Sep. 11, 2008 for U.S. Appl. No. 11/416,710.
Response to Non-Final, Sep. 19, 2008 for U.S. Appl. No. 11/416,710.
Non-Final Rejection, Dec. 30, 2008 for U.S. Appl. No. 11/416,710.
Response to Non-Final, Mar. 27, 2009 for U.S. Appl. No. 11/416,710.
Non-Final Rejection, Dec. 29, 2008 for U.S. Appl. No. 11/416,913.
Response to Non-Final, Mar. 25, 2009 for U.S. Appl. No. 11/416,913.
Restriction Requirement, Mar. 27, 2009 for U.S. Appl. No. 11/416,756.
Response to Non-Final, Apr. 27, 2009 for U.S. Appl. No. 11/416,756.
Final Rejection, Mar. 17, 2009 for U.S. Appl. No. 11/416,943.
Response to Final, Jun. 17, 2009 for U.S. Appl. No. 11/416,943.
Non-Final Rejection, May 19, 2009 for U.S. Appl. No. 11/525,363.
International Search Report, Jun. 17, 2008 for PCT/US2006/036461.
Non-Final Rejection, Sep. 15, 2008 for U.S. Appl. No. 11/527,797.
Response to Non-Final, Dec. 15, 2008 for U.S. Appl. No. 11/527,797.
Final Rejection, Mar. 30, 2009 for U.S. Appl. No. 11/527,797.
Response to Final, May 19, 2009 for U.S. Appl. No. 11/527,797.
Non-Final Rejection, Nov. 12, 2008 for U.S. Appl. No. 11/634,020.
Response to Non-Final, Feb. 17, 2009 for U.S. Appl. No. 11/634,020.
Non-Final Rejection, Jun. 24, 2009 for U.S. Appl. No. 11/634,020.
International Search Report, May 12, 2008 for PCT/US2007/024921.
International Search Report, Jun. 17, 2008 for PCT/US2007/016571.
U.S. Appl. No. 11/881,788.
U.S. Appl. No. 11/881,064.
U.S. Appl. No. 11/122,689.
Non-Final Rejection, Feb. 26, 2008.

Response to Non-Final, Aug. 29, 2008 for U.S. Appl. No. 11/122,689.
Final Rejection, Nov. 18, 2008 for U.S. Appl. No. 11/122,689.
Response to Final, Mar. 17, 2009 for U.S. Appl. No. 11/122,689.
Examiner Interiew, Apr. 13, 2009 for U.S. Appl. No. 11/122,689.
Non-Final Rejection, Apr. 27, 2009 for U.S. Appl. No. 11/122,689.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final, Apr. 6, 2009 for U.S. Appl. No. 11/122,679.
Non-Final Rejection, Apr. 4, 2008 for U.S. Appl. No. 11/416,710.
Informal Response to Non-Final, Aug. 4, 2008 for U.S. Appl. No. 11/416,710.
Final Rejection, Aug. 3, 2009 for U.S. Appl. No. 11/416,913.
Non-Final Rejection, Aug. 4, 2009 for U.S. Appl. No. 11/416,756.
Non-Final Rejection, Sep. 3, 2008 for U.S. Appl. No. 11/416,943.
Response to Non-Final, Dec. 5, 2008 for U.S. Appl. No. 11/416,943.
Examiner Interview Summary Record, Aug. 18, 2009 for U.S. Appl. No. 11/122,689.
Response to Nonfinal, Aug. 27, 2009 for U.S. Appl. No. 11/122,689.
Notice of Allowance, Aug. 21, 2009 for U.S. Appl. No. 11/122,679.
Examiner Interview Summary Record, Sep. 9, 2009 for U.S. Appl. No. 11/122,679.
Examiner Interview Summary Record, Mar. 31, 2009 for U.S. Appl. No. 11/416,943.
Examiner Interview Summary Record, Sep. 9, 2009 for U.S. Appl. No. 11/416,943.
Response to Non-final, Sep. 23, 2009 for U.S. Appl. No. 11/634,020.
A Taxonomy of Automated Trade Execution Systems, Ian Domowitz, Journal of International Money and Finance, (1993), 12, pp. 607-631.
Roger D. Huang et al., Tick Size, Bid-Ask Spreads and Market Structure, Working Paper 99-05 Version: Feb. 8, 2001; Forthcoming Journal of Financial and Quant. Anal. P1-29.
Bart Frijns et al., Price discovery in tick time, Journal of Empirical Financial, vol. 16, Issue 5, Dec. 2009, p. 759-776.
Tseng, K.C., Supermontage as a New Trading System of NASDAQ, Investment Management and Financial Innovations, Mar. 2005.
Dec. 14, 2009 Notice of Allowance for U.S. Appl. No. 11/122,689.
Jan. 26, 2010 Notice of Allowance for U.S. Appl. No. 11/122,689.
Mar. 1, 2010 Notice of Allowance for U.S. Appl. No. 11/122,689.
Jan. 15, 2010 Notice of Allowance for U.S. Appl. No. 11/122,679.
Nov. 16, 2009 Notice of Allowance for U.S. Appl. No. 11/345,420.
Nov. 23, 2009 Response to Nonfinal for U.S. Appl. No. 11/345,421.
Apr. 2, 2010 Notice of Allowance for U.S. Appl. No. 11/345,421.
Dec. 29, 2009 Notice of Allowance for U.S. Appl. No. 11/416,942.
Jan. 26, 2010 Notice of Allowance for U.S. Appl. No. 11/416,942.
Feb. 24, 2010 Notice of Allowance for U.S. Appl. No. 11/416,942.
Jun. 16, 2010 Notice of Allowance for U.S. Appl. No. 11/416,942.
Mar. 22, 2010 Notice of Allowance for U.S. Appl. No. 11/416,710.
Jan. 22, 2010 Nonfinal Rejection for U.S. Appl. No. 11/416,913.
Jun. 22, 2010 Response to Nonfinal for U.S. Appl. No. 11/416,913.
Apr. 27, 2010 Final Rejection for U.S. Appl. No. 11/416,756.
Dec. 14, 2009 Response to Nonfinal for U.S. Appl. No. 11/416,943.
Mar. 23, 2010 Nonfinal Rejection for U.S. Appl. No. 11/416,943.
Jun. 23, 2010 Response to Nonfinal for U.S. Appl. No. 11/416,943.
Nov. 16, 2009 Response to Nonfinal for U.S. Appl. No. 11/525,363.
Aug. 12, 2009 Nonfinal Rejection for U.S. Appl. No. 11/527,797.
Nov. 17, 2009 Response to Nonfinal for U.S. Appl. No. 11/527,797.
Jan. 26, 2010 Final Rejection for U.S. Appl. No. 11/527,797.
Dec. 28, 2009 Final Rejection for U.S. Appl. No. 11/634,020.
Mar. 17, 2010 Response to Final for U.S. Appl. No. 11/634,020.
Apr. 28, 2010 Nonfinal rejection for U.S. Appl. No. 11/634,020.
Nov. 6, 2009 Nonfinal Rejection for U.S. Appl. No. 11/880,686.
May 3, 2010 Response to Nonfinal for U.S. Appl. No. 11/880,686.
Dec. 1, 2009 Nonfinal Rejection for U.S. Appl. No. 11/881,789.
Mar. 19, 2010 Response to Nonfinal for U.S. Appl. No. 11/881,789.
Jun. 15, 2010 Notice of Allowance for U.S. Appl. No. 11/416,710.
Aug. 16, 2010 Notice of Allowance for U.S. Appl. No. 11/122,679.
Jul. 22, 2009 EIC3600 Search Report for U.S. Appl. No. 11/122,679.
Jul. 2, 2009 EIC3600 Search Report for U.S. Appl. No. 11/345,420.
Aug. 4, 2010 Notice of Allowance for U.S. Appl. No. 11/345,421.
Jan. 30, 2009 Austrian Patent Office Search Report and Written Opinion for SG 200716681-2.
Jul. 6, 2010 Proposed Examiner's Amendment for U.S. Appl. No. 11/525,363.
Aug. 3, 2010 Notice of Abandonment for U.S. Appl. No. 11/527,797.
Jul. 28, 2010 Response to Office Action for U.S. Appl. No. 11/634,020.
Jul. 6, 2010 Nonfinal rejection for U.S. Appl. No. 11/880,840.
Jul. 21, 2010 Final Office Action for U.S. Appl. No. 11/880,686.
Aug. 18, 2008 Final Rejection for U.S. Appl. No. 11/880,852.
Jun. 30, 2010 Nonfinal Rejection for U.S. Appl. No. 11/881,064.
Aug. 20, 2010 Restrict Requirement for U.S. Appl. No. 11/881,789.
Jun. 29, 2010 Nonfinal Rejection for U.S. Appl. No. 11/881,788.
Sep. 7, 2010 Notice of Allowance for U.S. Appl. No. 11/345,420.
Aug. 26, 2010 Final Rejection for U.S. Appl. No. 11/416,943.

* cited by examiner

| IBM 261 | | | | | | | | |
|---|---|---|---|---|---|---|---|---|
| | | Percentage/of Time 262 | | | | | Volume | |
| Firm | At Inside 264 | At Best Bid 266 | At Best Ask | W/in $0.03 of BBO 268 | W/in $0.03 of Best Bid 270 | W/in $0.03 of Best Ask 272 | At Bid 274 | At Ask 276 |
| Full Service 1 | 18.8% | 33.1% | 4.5% | 5.8% | 11.6% | 0.0% | 831 | 200 |
| Full Service 2 | 10.5% | 18.9% | 2.2% | 53.5% | 49.7% | 57.3% | 2,313 | 2,462 |
| Market Maker 1 | 0.0% | 0.0% | 0.0% | 0.0% | 0.0% | 0.0% | 0 | 0 |
| Direct Access 1 | 0.0% | 0.0% | 0.0% | 0.0% | 0.0% | 0.0% | 0 | 0 |
| Full Service 3 | 0.0% | 0.0% | 0.0% | 0.0% | 0.0% | 0.0% | 0 | 0 |

As of <date>

FIG. 15

Summary of Liquidity and Revenue Distribution

| <Date> | % Time at Inside | Weighted Time at Inside | Volume and Open Interest Factors | % Revenue Distribution |
|---|---|---|---|---|
| Market Center 1 | 72 | 84 | 0.2 | 7.9 |
| Market Center 2 | 63 | 58 | 0.7 | 2.2 |
| Market Center 3 | 89 | 92 | 0.9 | 21.6 |
| Market Center 4 | 93 | 95 | 0.5 | 24.3 |

FIG. 16

Market Participant Report

| Market Participant | % Time at Inside | Volume at Inside | W/in $0.03 of BBO | Volume W/in $0.03 of BBO | % Revenue Distribution |
|---|---|---|---|---|---|
| Broker/Dealer 1 | 2.4% | 568 | 5.4% | 1562 | 1.9% |
| Full Service 2 | 17.5% | 4,954 | 53.5% | 15244 | 2.2% |
| Market Maker 1 | 47.7% | 6,715 | 42.8% | 5921 | 11.4% |
| Direct Access 1 | 24.7% | 1,843 | 16.5% | 1356 | 5.7% |

As of <date>

LIQUIDITY ANALYSIS SYSTEM AND METHOD

BACKGROUND

Liquidity, in one sense, refers to how easily one can get into or out of an investment in a financial instrument (e.g., securities, futures contracts, options, bonds, etc.). In an illiquid market, sellers cannot easily find buyers. When that happens, investment risk can be high because sellers cannot get their money out of their investments easily. A liquid market also tends to have better price stability and increased overall order volume because issuers, investors and market participants typically seek out the most liquid marketplaces.

As a result, market centers, such as securities exchanges, try to make the most liquid market possible. One way market centers attempt to generate market liquidity is through market makers. Market makers are firms or individuals who "make markets" in a financial instrument by quoting the prices at which they are willing to buy or sell that financial instrument. These price quotes—bids and offers (or "bids and asks")—are published to the investing community via the various data feeds put out by the market centers where the given market makers operate. When investors or their agents check the price quotes and decide to make a trade, the market maker for that security will generally guarantee to buy or sell at least some of the shares at the published price. Because market makers are willing to take on risk themselves and follow through on published bid or ask prices, they can provide liquidity to the marketplace.

The key to a market maker's ability to generate liquidity and bring these benefits to the marketplace is its ability to make effective quotes and trades. Every market center's goal, and as such every market maker for that market center's goal, is to post the highest bid and lowest offer (e.g., the "inside" market) in the entire marketplace so they can consistently execute orders and provide the most liquidity. At any given moment, the best price across all market centers is the market best bid ("Market Best Bid") or market best offer ("Market Best Offer"). Therefore, every market center, and every market maker associated with that market center, wants to be setting the Market Best Bid and Market Best Offer (or trading very near those prices) as often as possible.

Though every market center and market maker wants to be at the Market Best Bid and Market Best Offer, there is presently no effective way for a market center, a market maker or an investor to assess how often a market center, a market maker or any other market participant is at the inside market and, therefore, no effective way to gauge a market center's liquidity or market maker's ability to generate liquidity in a market.

Accordingly, there is a need for a market liquidity analysis system and method that allows interested persons to monitor, collect and analyze a market center's, a market maker's or any market participant's trading activity to measure liquidity or to assess such entity's or individual's role in generating liquidity.

SUMMARY

According to one aspect of the present invention, a method for analyzing market center liquidity includes monitoring orders and quotes for a specified financial instrument for a specific market participant and analyzing the orders and quotes made by the specified market participant in the specified financial instrument and determining a best price for the market participant at a certain time. It further includes retrieving the market best price for the specified financial instrument for the same time and comparing the best price determined for the market participant at the certain time to the market best price for the same time. It further includes recording the results of the comparison.

DESCRIPTION OF THE DRAWINGS

These and other features, aspects and advantages of the present invention will become better understood with regard to the following description, appended claims and accompanying drawings where:

FIG. 15 depicts an exemplary liquidity report;

FIG. 16 depicts an exemplary report on liquidity generated across market centers; and FIG. 17 depicts an exemplary report on liquidity generated by individual market participants.

DETAILED DESCRIPTION

Figure 1:
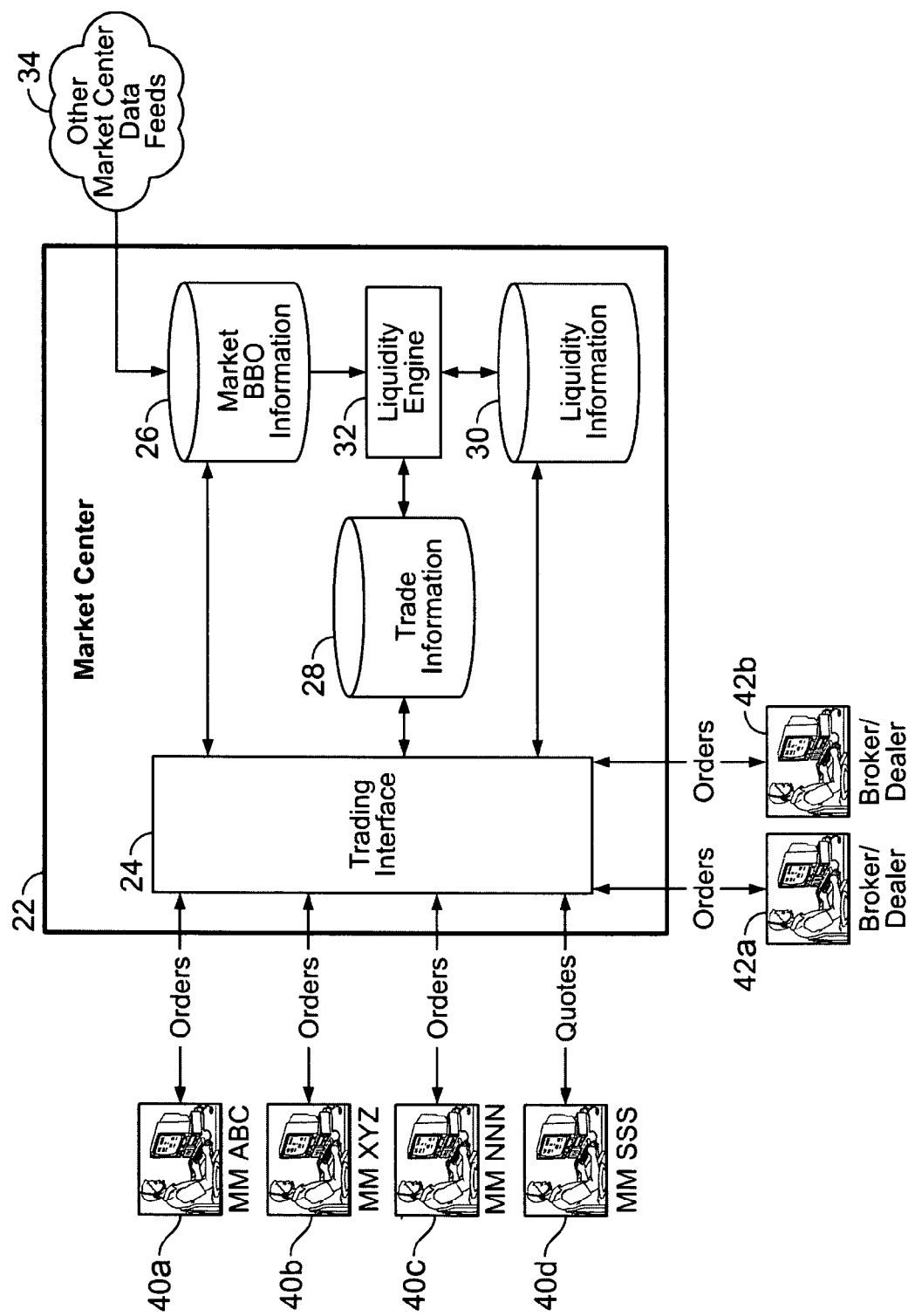
FIG. 1 is a block diagram illustrating the trading environment in which an embodiment of the present invention operates.

Referring to FIG. 1, a trading environment in which an embodiment of the liquidity analysis system and method of the present invention is depicted. The examples discussed herein describe the use and application of the present invention in an equity security market center environment, but it should be understood that the present invention could be used in any type of financial instrument market center environment (e.g., securities, futures contracts, options, bonds, etc.). In the environment depicted, multiple market participants interact with a trading interface 24 of a market center 22, for example market makers 40 and broker/dealers 42 in this embodiment. Four market makers 40a-d and two broker/dealers 42a-b are depicted in FIG. 1 for the sake of discussion, but it should be understood that any number of market makers 40, broker/dealers 42 or any other market participant could interact with the market center 22. The trading interface 24 of the market center 22, in this example, is a program that allows market participants to enter information regarding their trading interests, such as orders and quotes, validates and then processes the information (e.g., executing orders, publishing quotations, etc.). However, it should be noted that such tasks may be handled by other components of a market center's trading-related systems without impacting the nature of the invention discussed herein. The market center 22 also maintains data in exemplary data structures 26, 28, 30. This data may include, among other information, data regarding trading interest, such as order data, which is stored in trade information data structures 28. The market center 22 of the present invention includes a liquidity engine 32 that analyzes and reports on market center liquidity, which is discussed in detail below. It should be noted, however, that the present invention can be used to analyze and report on any market participant's or any market center's trading interest that includes a price and a size. Terms such as "quote" and "order" are used for clarity and are merely exemplary of the types of "trading interests" that can be processed. Furthermore, the examples and accompanying figures focus on order processing so that the present invention may be most easily understood, and these depictions are not intended to limit the scope of the present invention. The liquidity engine 32 can analyze any trading interest generated by any individual or any number of market participants or market centers.

Throughout the discussion herein, it should also be understood that the details regarding the operating environment, data structures, and other technological elements surrounding the liquidity engine 32 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, it should be understood that the market center 22 referred to herein refers to a computing system having sufficient processing and memory capabilities and does not refer to a specific physical location. In fact, in certain embodiments, the computing system may be distributed over several physical locations. The market center of the type described herein may support any type of trading interface on any suitable computer system, and in this embodiment, the code for the trading interface 24 and the liquidity engine 32 are stored in the market center's memory.

In this embodiment, the market center 22 receives data feeds 34 that contain information from many other market centers, including quote and trade information. This market center information for the entire market is analyzed to determine the market best bid and offer ("BBO") in the market for any security at any given time. The BBO information is stored in the market center 22 in data structures 26. The BBO, which is also referred to as the "inside market," is the highest bid and the lowest offer available in the market at a specific time. If a higher bid or lower offer is made, the BBO is updated immediately, and the new price becomes the "inside market." The gap in price between the highest bid and lowest offer for a market maker is called the "spread" or the "market maker spread," since the market makers typically are responsible for generating markets by making quotes in their assigned securities. The term "spread" is also frequently used to describe the gap in price between the highest bid and the lowest offer for a market center and other market participants. The smaller the spread (i.e., the closer the gap between the bid and the offer), the better it is for market liquidity and, as a result, the better it is for issuers and investors. In this embodiment, the liquidity engine 32 compares each market maker's personal best bid and offer to a market BBO and stores the resulting liquidity information in data structures 30. This comparison results in liquidity information measuring how often each market maker 40 or market participant is at or near the market BBO in each security traded throughout the day. The examples discussed herein describe the use and application of the present invention with equity security products, but it should be understood that the present invention could be used with any type of security or financial instrument (e.g., futures contracts, options, bonds, etc.).

Figure 2:
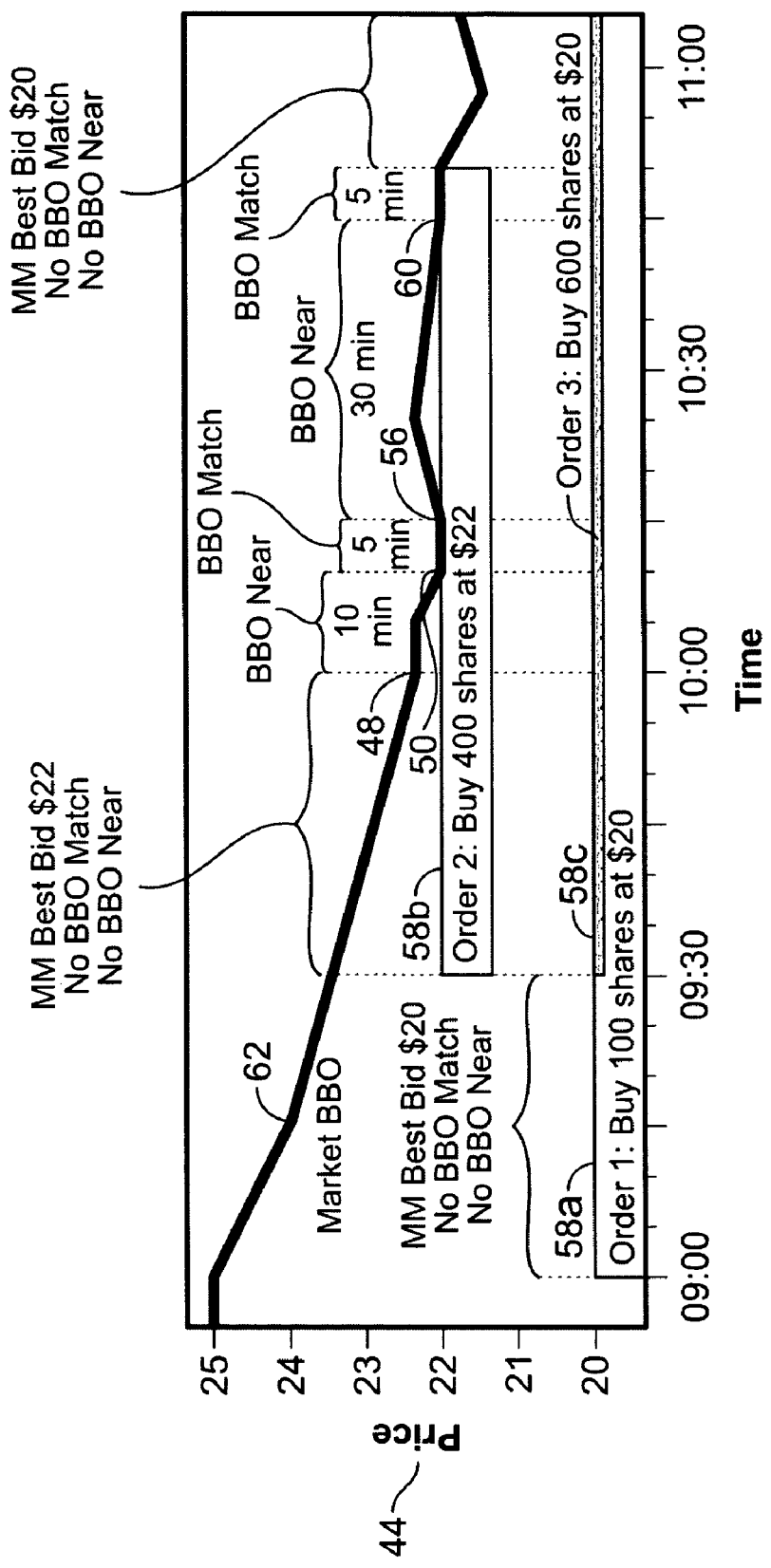
FIG. 2 depicts a timeline chart of a portion of an exemplary trading day.

FIG. 2 illustrates how a market is made in a security in a simplified trading scenario and how a market maker's trading interests relate to the market BBO. Such information is used by the liquidity engine 32 of the present invention to determine a market maker's ability to generate liquidity. When a market maker 40 initially enters a bid to buy or an offer to sell a security, that trading interest remains "alive" in the trading interface 24 until all of the shares designated in that trading interest are accounted for, such as by being executed, cancelled, transferred, etc. A market maker 40 may enter multiple orders and quotes into the system for the same security at the same or at different prices. However, for the purpose of determining a market maker's ability to generate liquidity, only the highest bid or the lowest offer price for that security is considered. It should be understood that the example of trading practices depicted in FIG. 2 has been simplified for the sake of explanation.

In the example depicted in FIG. 2, at 9:00 a.m., the given market maker 40 enters Order 1 to buy 100 shares of fictitious security WWW for $20, as indicated at 58a. Since the market maker 40 does not have any other trading interest for security WWW active at this time, his best personal offer is $20. The line 62 on the chart of FIG. 2 represents the market BBO for security WWW at any given time. At 09:30 a.m., the market maker 40 enters two new orders 58b, 58c, and his best price is now $22. At 10:00 a.m., the market BBO drops to a bid of $22.03, as indicated at 48, and now the market maker 40 is considered to be "near" the market BBO (since "near" is defined in this example as being within 3 cents of the market BBO). At 10:10 a.m., when the market BBO price drops again, as indicted at 50, the market maker 40 is now matching the market BBO. Within the next 5 minutes, the market maker 40 executes some of the shares in Order 2 (58b) before the market BBO 62 price moves up to $22.03, as indicated at 56. The market maker 40 still has remaining shares bid at $22, so the market maker's best bid remains within 3 cents of the market BBO. At 10:45 a.m., the market BBO 62 drops to $22, as indicated at 60, and the market maker 40 is again matching the market BBO. The remaining shares of Order 2 (58b) are executed over the course of the next 5 minutes. When all of the shares in Order 2 (58b) are exhausted, the market maker 40 no longer has any orders at $22, and his best bid price in this security is once again $20 for 700 shares (the volume of Order 1 (58a) plus the volume of Order 3 (58c)). This price does not match nor is it near the market BBO.

Figure 3:
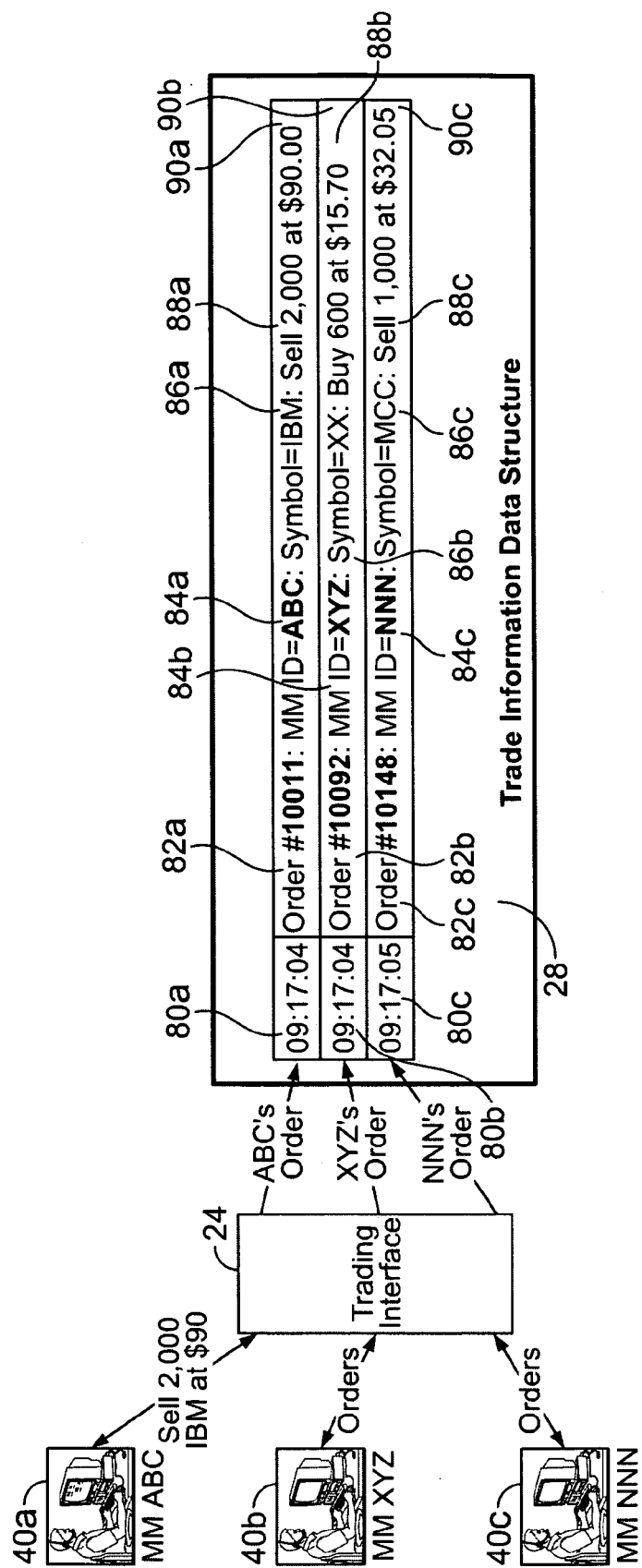
FIG. 3 depicts exemplary trading records generated by a trading interface.

Referring to FIG. 3, during the course of the trading day, the trading interface 24 captures all market center trading activity and stores the trade information in data structures 28. In this embodiment, each market maker 40 is assigned a unique market maker identification code 84, and the trading interface 24 embeds this code 84 into every order record 90 generated by the trading interface 24, storing the data in the trade information data structures 28 so that one market maker's trading Merest records can be distinguished from another's. In the example depicted in FIG. 3, Market Maker ABC's identification code is ABC 84a, Market Maker XYZ's identification code is XYZ 84*b* and Market Maker NNN's identification code is NNN 84*c*. Each order record 90 also contains the time of the transaction 80, an order identification code 82 which is generated for each order that a market maker 40 creates, the symbol identifying the security 86, and an order transaction description 88. In the example depicted, Market Maker ABC's order has been assigned order identification number 10011 (82*a*), Market Maker XYZ's has been assigned order identification number 10092 (82*b*), and Market Maker NNN's has been assigned order identification number 10148 (82*c*). It should be understood that order records can take many varying forms and be of varying sizes and that order records far more complex than the examples described herein may be utilized, and such embodiments are within the scope of the invention disclosed herein.

Figure 4:
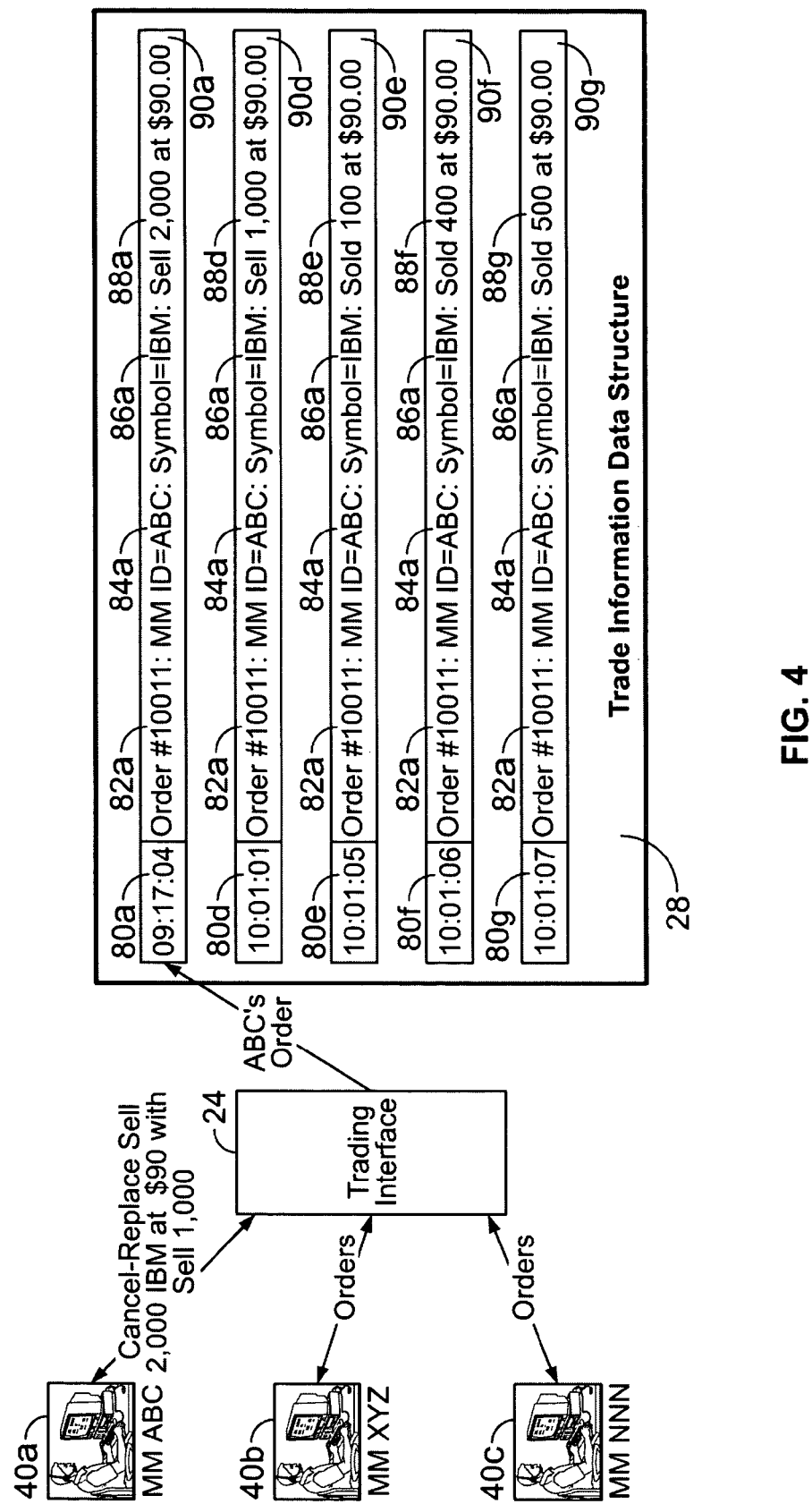
FIG. 4 depicts exemplary trading records generated for a single order.

Referring to FIG. 4, the trading interface 24 may generate several records 90 for a single market maker order (i.e., records 90*a* and 90*d-g* for Order #10011 in this example). All records 90 of a single market maker order (e.g., execution records or modification records, such as cancel-replace, cancel, partial fill) will have the same order identification number 82. In the example depicted in FIGS. 3 and 4, the market maker ABC 40*a* initially entered an order to sell 2000 shares of IBM at $90 at 09:17:04 as indicated at record 90*a* (FIG. 3). As noted above, the trading interface 24 assigned the order identification number 10011 to this order. Then, as illustrated in FIG. 4, at 10:01:01, the market maker ABC 40*a* cancelled the initial sell order to sell 2000 shares of IBM at $90 (90*a*) and replaced it with an order to sell 1000 shares of IBM at $90 (90*d*). In this instance, since the orders are related, the trading interface 24 continues to assign the same order identification number 82 (i.e., order # 10011 in this example) to all the records 90 for this order. Records 90*e-g* are also part of order #10011.

Figure 5:
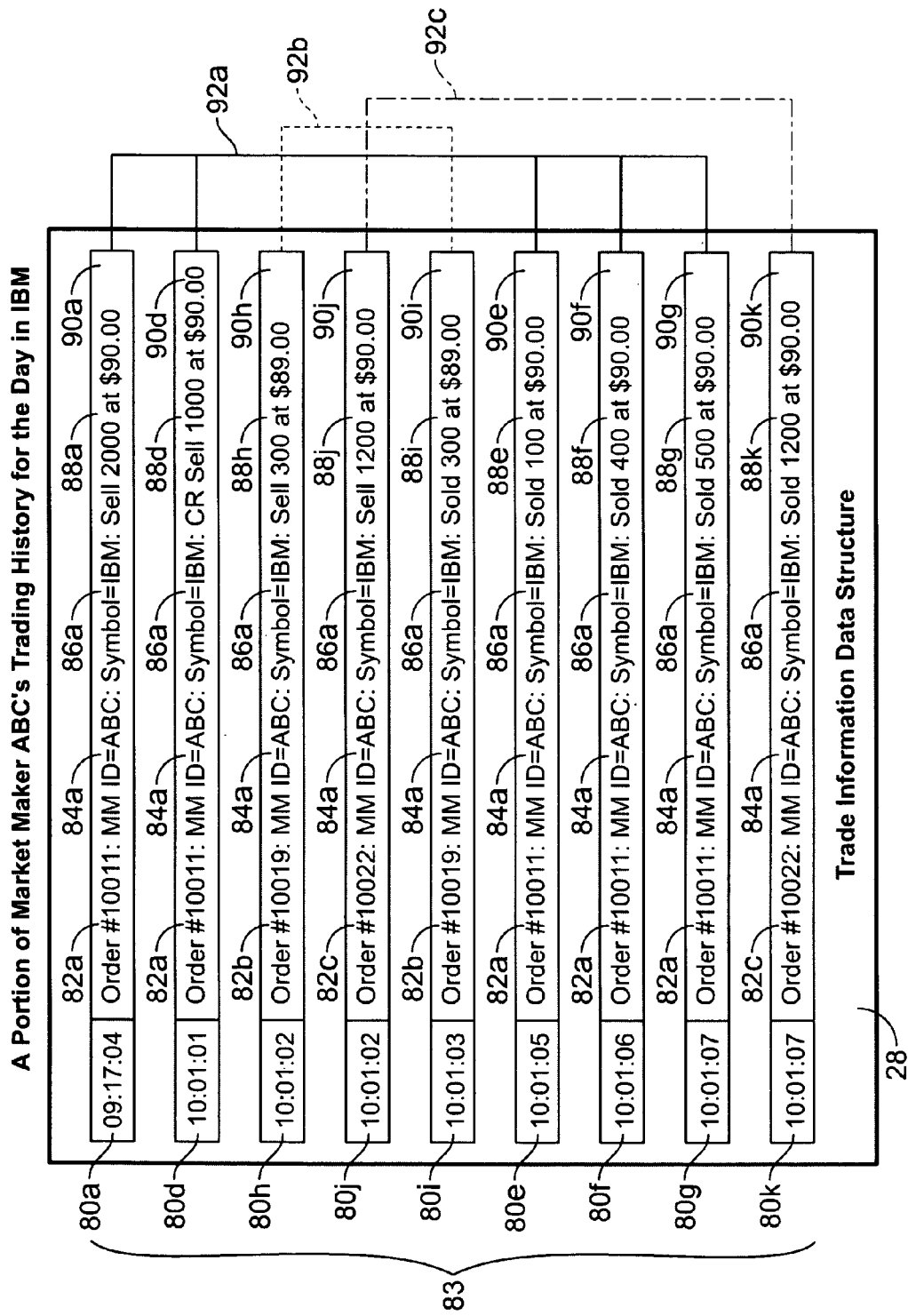
FIG. 5 depicts an exemplary set of order records for a specified market participant for a portion of a trading day.
Figure 6:
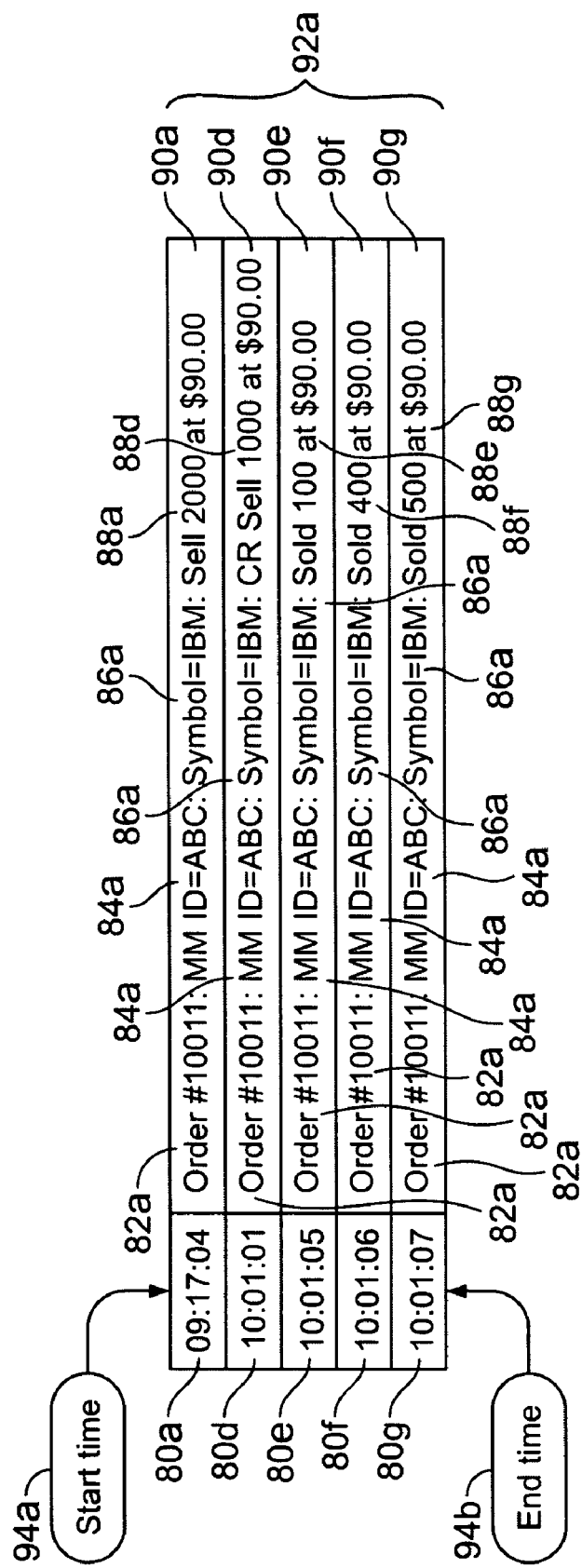
FIG. 6 depicts an exemplary set of records for an entire order.

Referring to FIG. 5, an example showing the trading history 83 for IBM for a few seconds in Market Maker ABC's day is depicted, as stored in the trade information data structures 28. Note that all individual records 90 with the same order identification number 82 constitute an entire order 92. As an example, FIG. 6 illustrates all of the records 90*a*, 90*d-g* relating to order #10011 (92*a*). Taken together, these records show the entire length of time that the order 92*a* was open. The order's start time 94*a* is the time that the order was initially entered 80*a*, and the order's end time 94*b* is the time the last outstanding shares were accounted for. Each event in the life of the order 92*a* is a separate but related record 90. The original order to sell 2000 shares, as indicated at record 90*a*, was replaced by an order to sell only 1000 shares, as indicated at record 90*d*. Therefore, in the subsequent three records 90*e*, 90*f*, 90*g*, when a total of 1000 shares were sold, all of the shares in the order 92*a* were accounted for and order #10011 stopped being an active order at 10:01:07 (80*g*).

Figure 7:
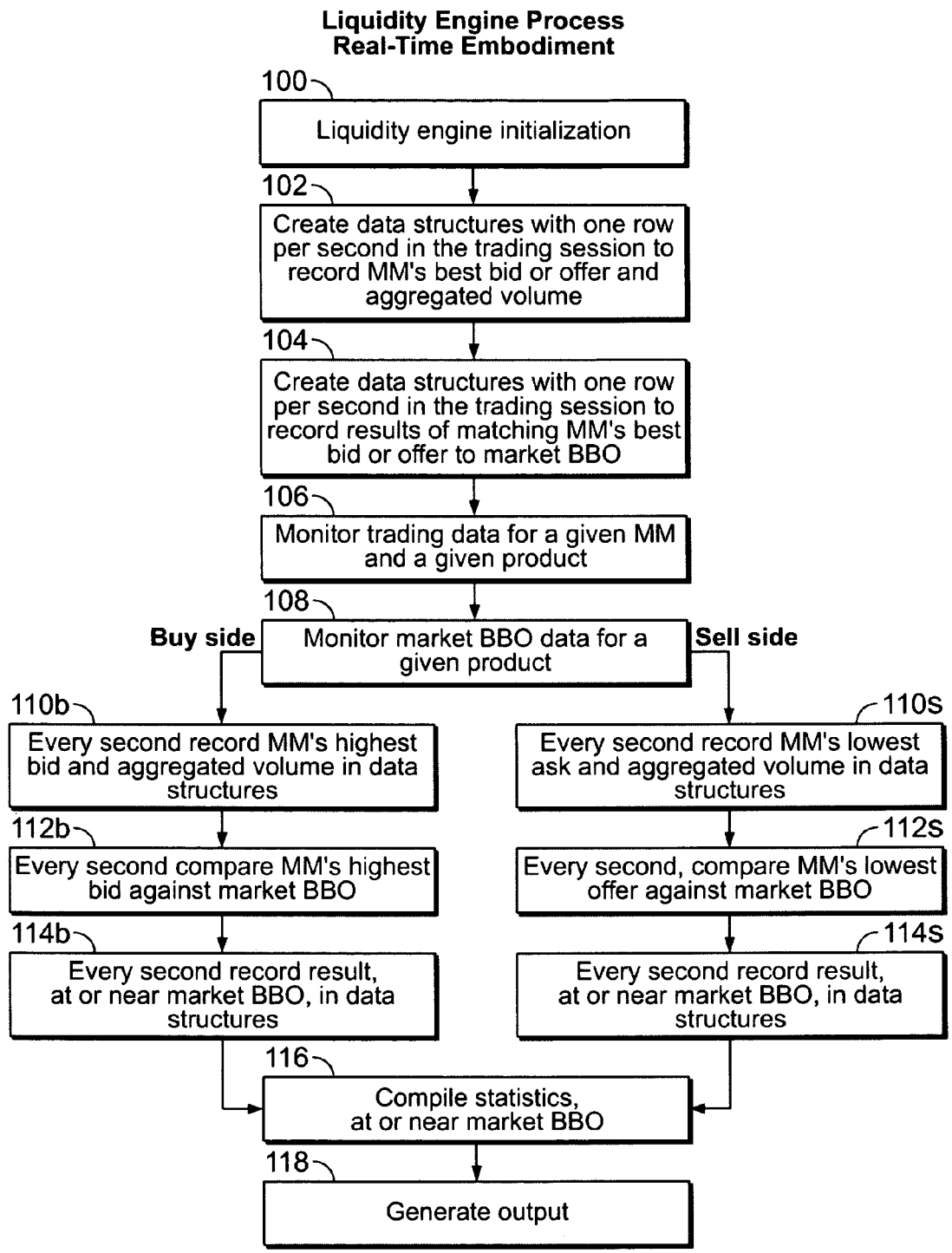
FIG. 7 is a flow diagram illustrating a process implemented in an embodiment of the present invention.

Referring to FIG. 7, an embodiment of the process of the liquidity engine 32 for use in analyzing market maker activity is illustrated. At step 100, the engine 32 is initialized. At step 102, in this embodiment, the engine 32 creates data structures 30 for use in storing the market maker's best bid, offer, and volume for each second of trading in a given security. At step 104, similar structures are created for the results of the matching between the market maker's best bid or offer and the market BBO. It should be noted that the actual storage of the data need not be identical to the structures described herein, only that there is sufficient storage for such data in some appropriate format and configuration. At step 106, the system begins monitoring trading for the given market maker 40 in the given security 86, and at step 108 it begins monitoring the market BBO for the security 86. At step 110*b*, 110*s*, the market maker's highest bid and lowest ask is recorded for every second of the trading day, as are the associated volumes for the given prices. However, the liquidity engine 32 ignores all records 90 for those order types that do not reflect a market maker's ability to generate liquidity so that such records 90 will not be included in the liquidity analysis that follows. Specifically, orders that were transferred to another marketplace, orders entered as market orders, immediate-or-cancel orders ("IOC") (i.e., orders to make the trade immediately or cancel the entire order), and NOW orders (i.e., orders to make the trade immediately or transfer the order to another market maker that can fill the order immediately) are examples of those excluded from this liquidity analysis. These types of orders have no impact on market liquidity and if included in the liquidity analysis would skew the final results. For example, market orders, which instruct the market maker to buy or sell at whatever price is presently available in the market, are not proper for inclusion in the liquidity analysis. By definition, executed market orders are always "at the market", and if these orders were included in analyzing how often a given market maker set his bid or ask price "at the market", it would improperly skew the numbers to the market maker's advantage.

At step 112*b*, 112*s*, the market maker's best prices are compared to the market BBO for the security of interest for each second, and at step 114*b*, 114*s*, the liquidity engine 32 records the results, whether the market maker 40 was at or near the market BBO price. "Near" may be defined as any price range, and it may also be modified to calculate more than one level of nearness to the market-wide prices (e.g., within 3 cents, within 5 cents, etc.). At step 116, the liquidity engine 32 examines the results of the matching process and calculates liquidity statistics. As discussed earlier, the examples herein calculate the percentage of time the market maker 40 is at or near the market BBO, but the liquidity engine may be configured to produce other statistical analysis (e.g., total time matching the market BBO). At step 118 the liquidity engine 32 outputs the results of the analysis. In the examples herein, the liquidity engine 32 outputs the data to an informational table, but the engine 32 may be configured to produce any appropriate type or format of output. It should also be noted that the steps on the buy side 110*b*-114*b* are identical in processing to the sell side steps 110*s*-114*s*, and while the buy side and sell side processing is broken out in this depiction for clarity, the actual buy-sell processing may integrated without changing the nature of the liquidity engine.

Figure 8:
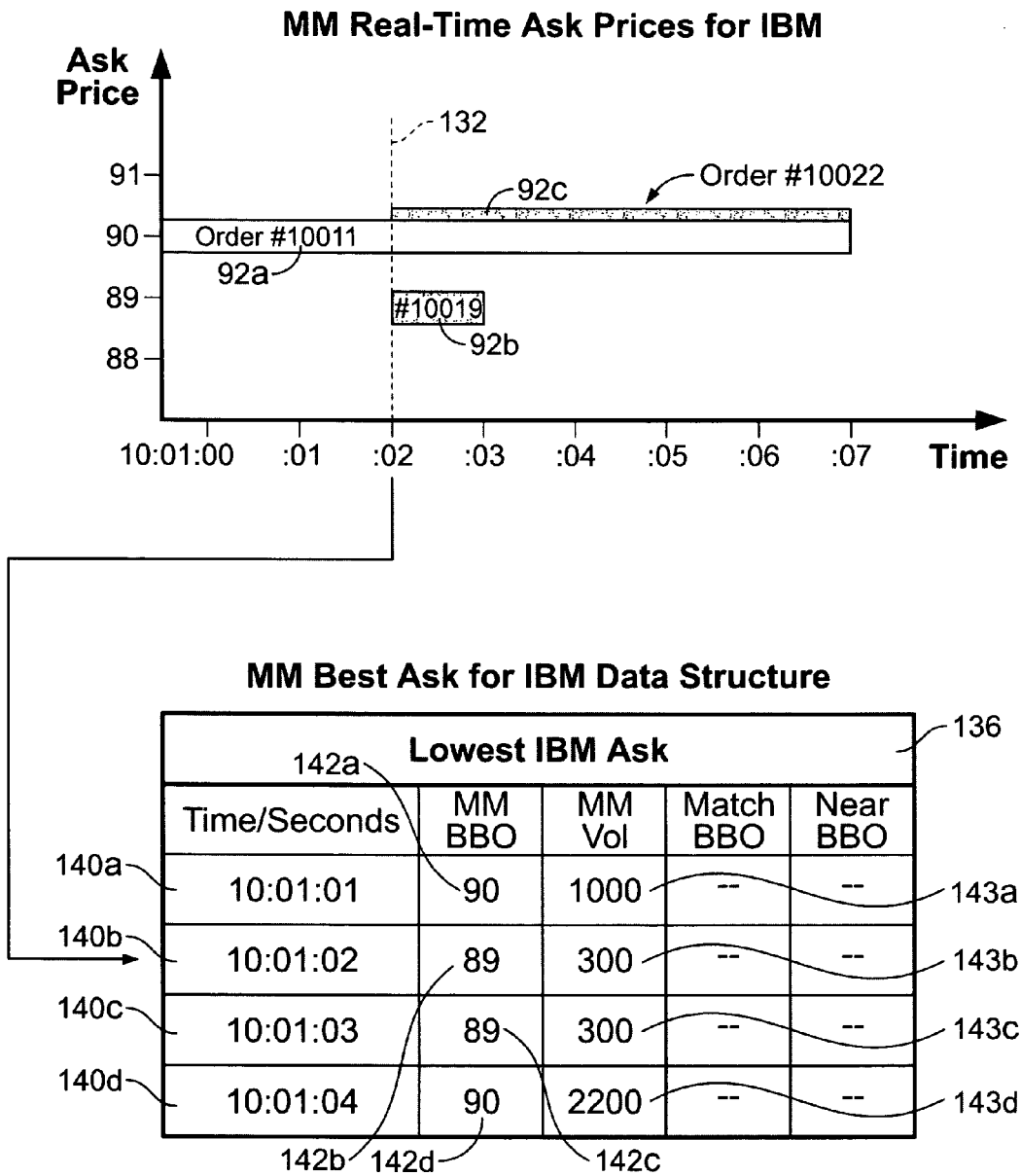
FIG. 8 illustrates an exemplary data structure of best price data for a specified market participant in a specified financial instrument.
Figure 9:
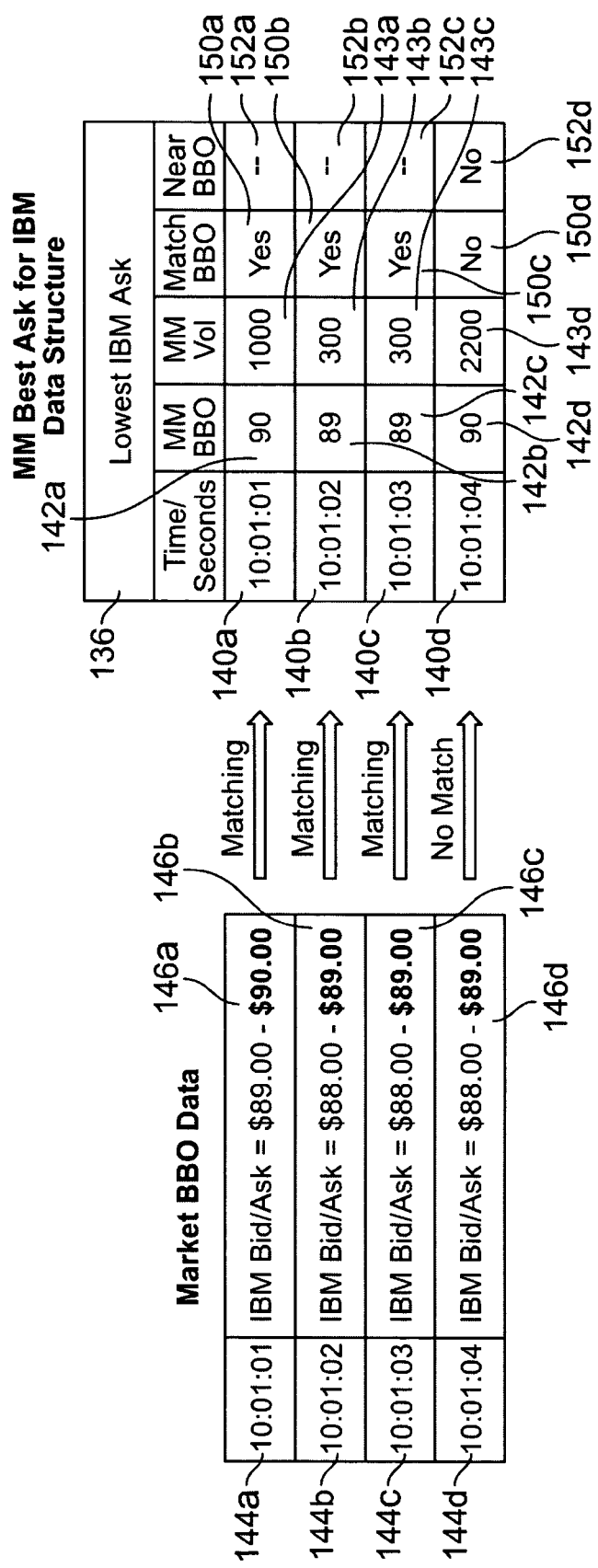
FIG. 9 illustrates exemplary data structures used in comparing a market participant's best price data to market best price data.

Referring to FIGS. 8 and 9, an example of the process executed by this embodiment of the liquidity engine 32 is illustrated. At 10:01:02 a.m., as indicated at 132, the liquidity engine 32 determines the market maker's best (lowest) ask price for IBM is $89 after the market maker 40 enters order #10019 (92*b*) (see also FIG. 5). As indicated at step 110*s* of FIG. 7 and depicted in FIG. 8, the liquidity engine 32 records the price and volume for order #10019 for that second in the sample data structure 136 at row 140*b* and in the data cells 142*b*, 143*b* corresponding to the second being analyzed. In this embodiment, the data structure 136 is a portion of data structure 30. Referring to FIG. 9, as indicated at step 112*s* of FIG. 7, the liquidity engine 32 compares the market BBO for this second to the market maker's best ask price. In this example, the liquidity engine 32 retrieves the market best ask price at 10:01:02 a.m. (144*b*), which in this example is $89 (146*b*). The liquidity engine 32 compares this market best ask price ($89) to the market maker's best ask price ($89) at 10:01:02 a.m. They are the same, so there is a match. The liquidity engine 32 records this in the data structure 136 in the "Match BBO" cell 150*b*. The liquidity engine 32 uses this data to compile the statistics it requires to analyze the liquidity generated by the given market maker 40 in a given product.

FIG. 7, and the example discussed above, describe an embodiment of the present invention. It should be understood that numerous variants of the method and system of this invention could be implemented without departing from the spirit or scope of this invention. For instance, the market BBO monitoring at step 108, the comparison of the market BBO with the market maker's best price at steps 112b, 112s or the recording of the results at steps 114b, 114s could all be performed on a delayed basis, rather than in real-time. Many of the aspects discussed herein with respect to liquidity processing could be delayed by seconds or hours, due to processing capabilities or otherwise, without impacting the liquidity analysis and reporting discussed herein.

Figure 10A:
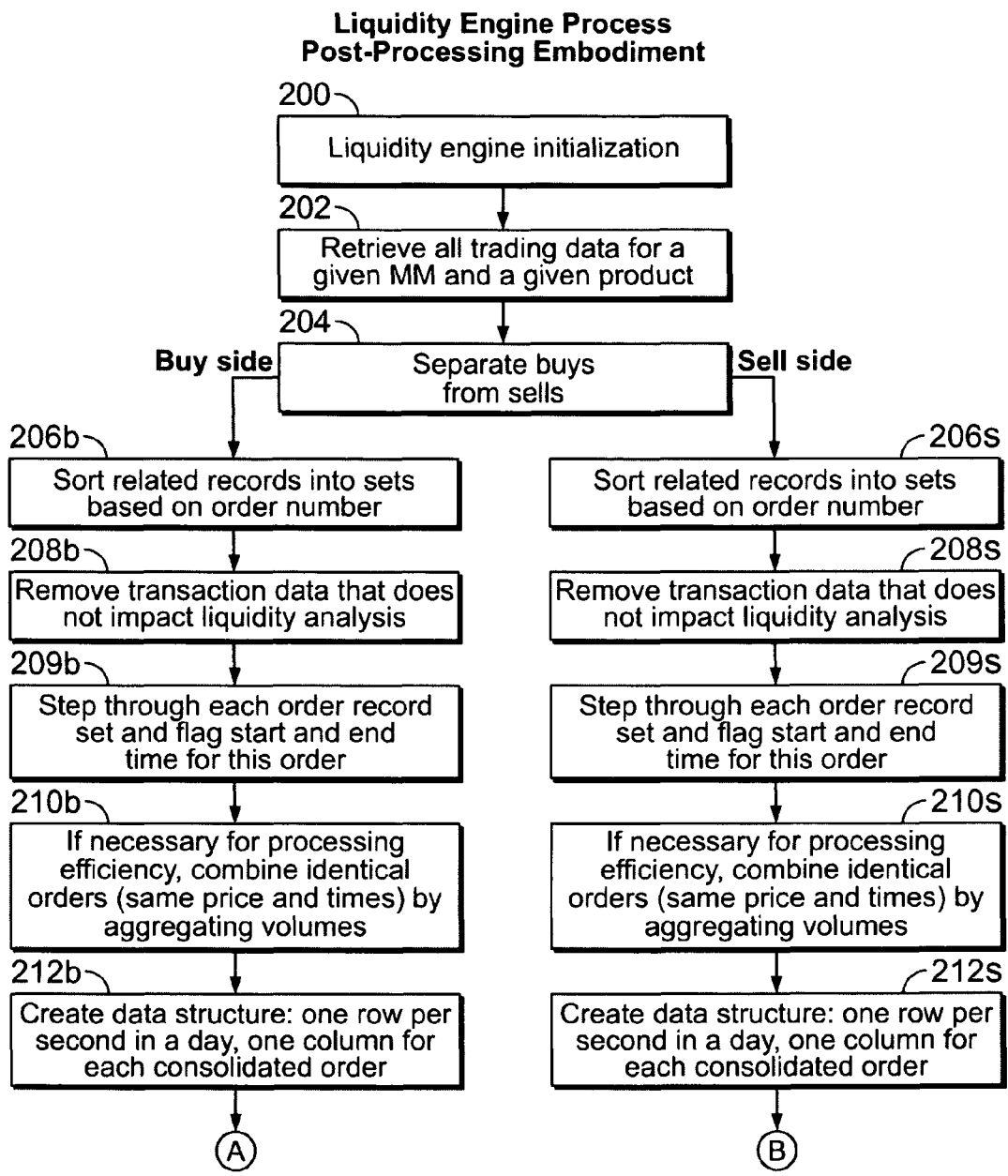
FIGS. 10A-10B are a flow diagram illustrating a process implemented in an embodiment of the present invention.
Figure 10B:
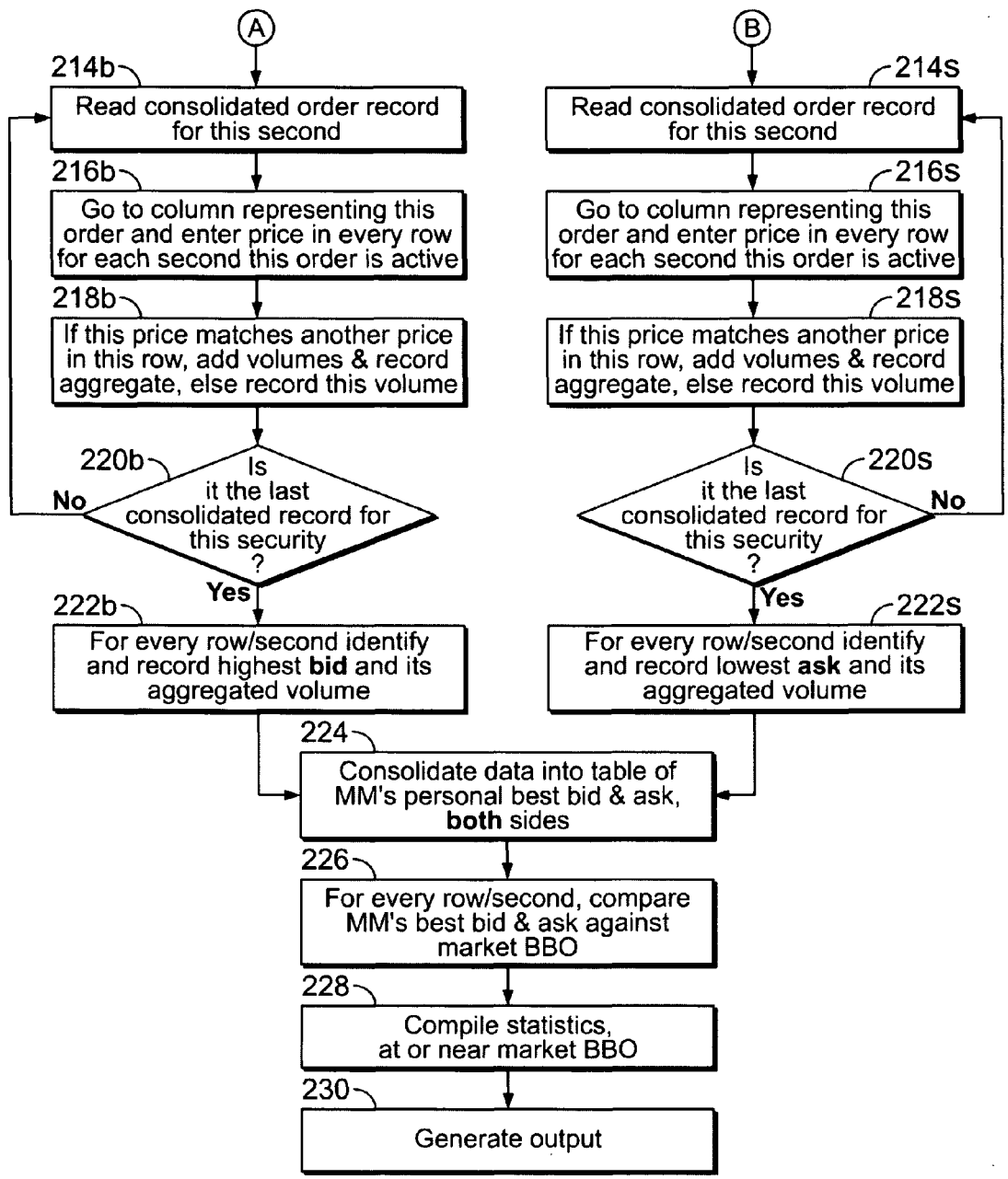

Referring to FIGS. 10A and 10B, another embodiment of the process of the liquidity engine 32 of the present invention is illustrated. In this embodiment, all processing of a market maker's best bid, ask, and volume is executed after the close of trading, rather than second-by-second in real-time. As such, the liquidity engine 32 in this embodiment must recreate the market maker's trading day in the given product before being able to compile and calculate liquidity statistics. Because the task of recreating a trading day is a complex one, the liquidity engine 32 processing in this embodiment is more complex than the processing illustrated in the "real-time" embodiment of FIG. 7. However, once the trading day is recreated, the liquidity engine 32 processing for this embodiment is comparable to the processing conducted in the "real-time" embodiment depicted in FIG. 7. This embodiment is most useful in environments where trade data cannot be monitored and processed in real-time by the liquidity engine 32.

As FIGS. 10A and 10B illustrate, at step 200, the engine 32 is initialized, and at step 202, the engine 32 retrieves all of the trading data records 90 from the trade information data structures 28 for a given market maker identification code 84 in a given security 86. At step 204, the liquidity engine 32 separates the buy records 90 from the sell records 90 for the given market maker 40 and security 86. Then at steps 206 through 210, the liquidity engine 32 sorts and validates the separated records before further processing. Note that the steps on the buy side 206b-210b are identical in processing to the sell side steps 206s-210s. In this embodiment, the buy and sell records are separated simply for processing efficiency, but they may instead be processed simultaneously without altering the liquidity analysis. At steps 206b, 206s, the liquidity engine 32 searches all of the records 90 retrieved and groups records 90 with the same order number 82 together into sets, so that an entire order 92 can be analyzed as a single item. At steps 208b, 208s, the liquidity engine 32 removes all records 90 for order types that do not reflect a market maker's ability to generate liquidity so that such records 90 will not be included in the liquidity analysis that follows. As with the real-time processing embodiment depicted in FIG. 7, orders that were transferred to another marketplace, orders entered as market orders, immediate-or-cancel orders ("IOC") (i.e., orders to make the trade immediately or cancel the entire order), and NOW orders (i.e., orders to make the trade immediately or transfer the order to another market maker that can fill the order immediately) are examples of those excluded from this liquidity analysis. These types of orders have no impact on market liquidity and if included in the liquidity analysis would skew the final results.

Figure 11:
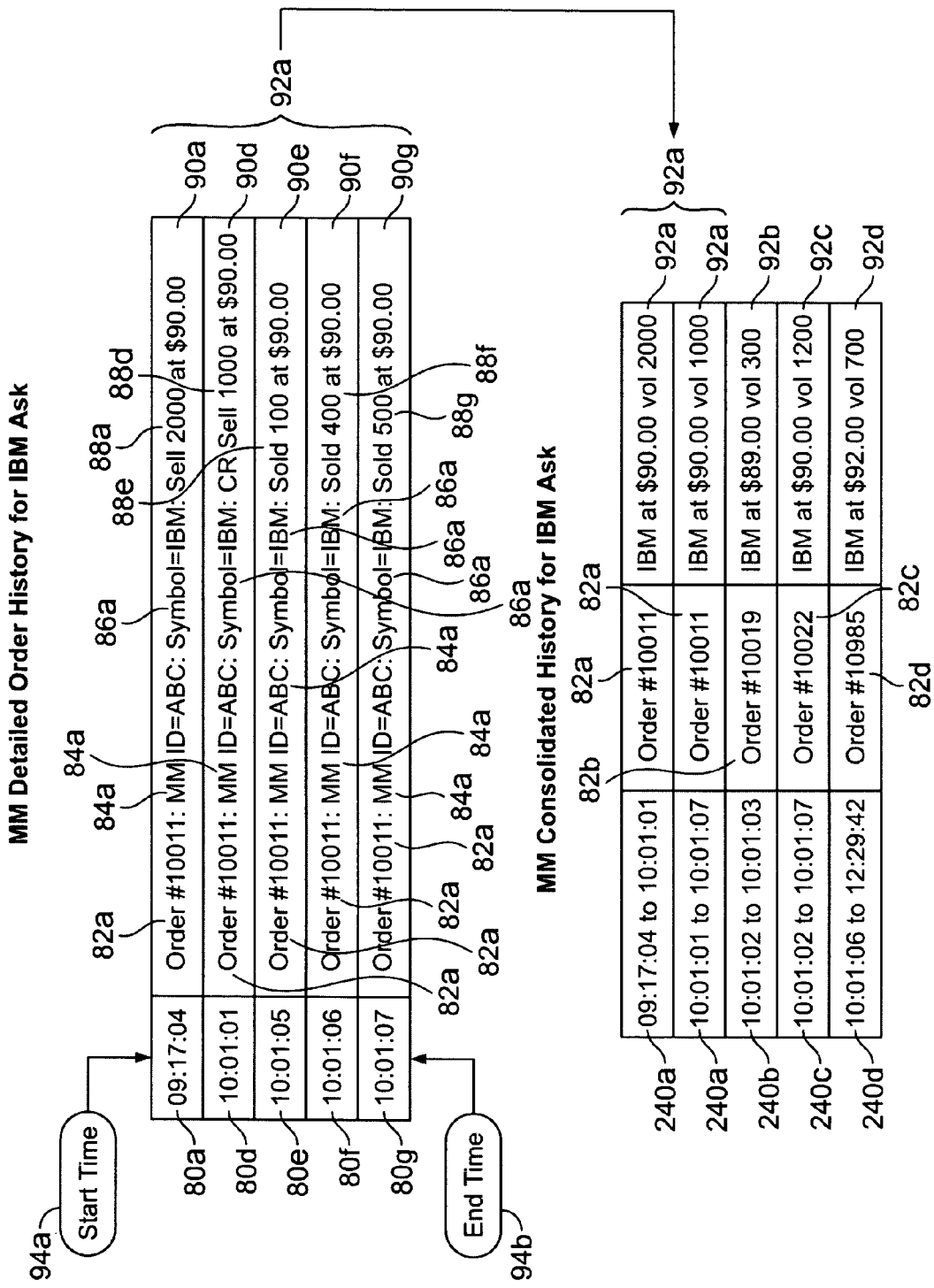
FIG. 11 depicts an exemplary consolidated order record.

In steps 209b, 209s, and with reference to FIG. 11, the liquidity engine 32 flags the order start time 94a and the order end time 94b for an entire set of records 90 for a single order 92. The order start time 94a corresponds to the time the order was initially entered, as indicated at 80a, and the order 92 ends when the last shares in the order 92 are accounted for, as indicated at 80g in this example (e.g., when all remaining shares are executed, cancelled, etc.). The start time and end time 94a, 94b frames the entire order 92. When the liquidity engine 32 later retrieves each set of records 90 for an order 92, it must record the order details as it reproduces the market maker's trading day for this security 86. As FIG. 11 illustrates, a post processed order 92 having multiple records 90 is treated as a single event. The liquidity engine 32 in this embodiment treats the multiple records as a consolidated order 240, which lasts for the duration the order 92 was open at the price and volume for that order. In this example, the multiple records 90 from order #10011 (90a, d-g) can be summarized as a $90 order that was active from 09:17:04 a.m. until 10:01:01 for 2000 shares of IBM 90a. Then, when the cancel-replace is entered, the modified order for 1000 shares of IBM at $90 is active from 10:01:01 until 10:01:07 a.m. as indicated at records 90d-g. Note that whether the liquidity engine treats this cancel-replace as two distinct orders which share the same order number, or whether it treats the order as a single order with a change in volume, there is no impact on the liquidity analysis. Because the order cancellation ends at exactly the moment the order replacement request takes effect, as indicated at records 90a, 90d and because the price remains unchanged, the resultant liquidity analysis remains unchanged. Had the cancel-replace indicated at record 90d altered the price of the order represented in the original order record 90a, the liquidity engine 32 would simply treat order 10011 (records 90a, d-g) as if it were two separate orders so that the price difference could be accounted for in the liquidity analysis. It should be understood, however, that this level of detail in order analysis is unnecessary in real-time processing (FIG. 7), since the liquidity engine 32 in real-time processing simply identifies the best bid, offer and associated volumes every second. The order number, its analysis and resolution is typically only important in post-processing because the liquidity engine 32 must recreate each market maker's trading day for a given product.

Orders 10019 (82b) and 10022 (82c), in FIG. 11, demonstrate how standard orders 92 having multiple records 90 (see FIG. 5) are treated as consolidated records 240b, 240c for processing purposes. Because the processing involved in sorting, validating, and analyzing individual records 90 can be very time- and resource-intensive, steps 210b, 210s illustrate additional processing efficiencies that may be implemented. For example, if two or more orders 92 are identical in price, start time, and resolution time, their volumes can be added and the multiple orders treated as a single order without skewing the liquidity data. Since these consolidations do not impact liquidity calculations, these types of efficiencies may be added or omitted from the liquidity engine 32 processing without changing the scope of the present invention.

Figure 12:
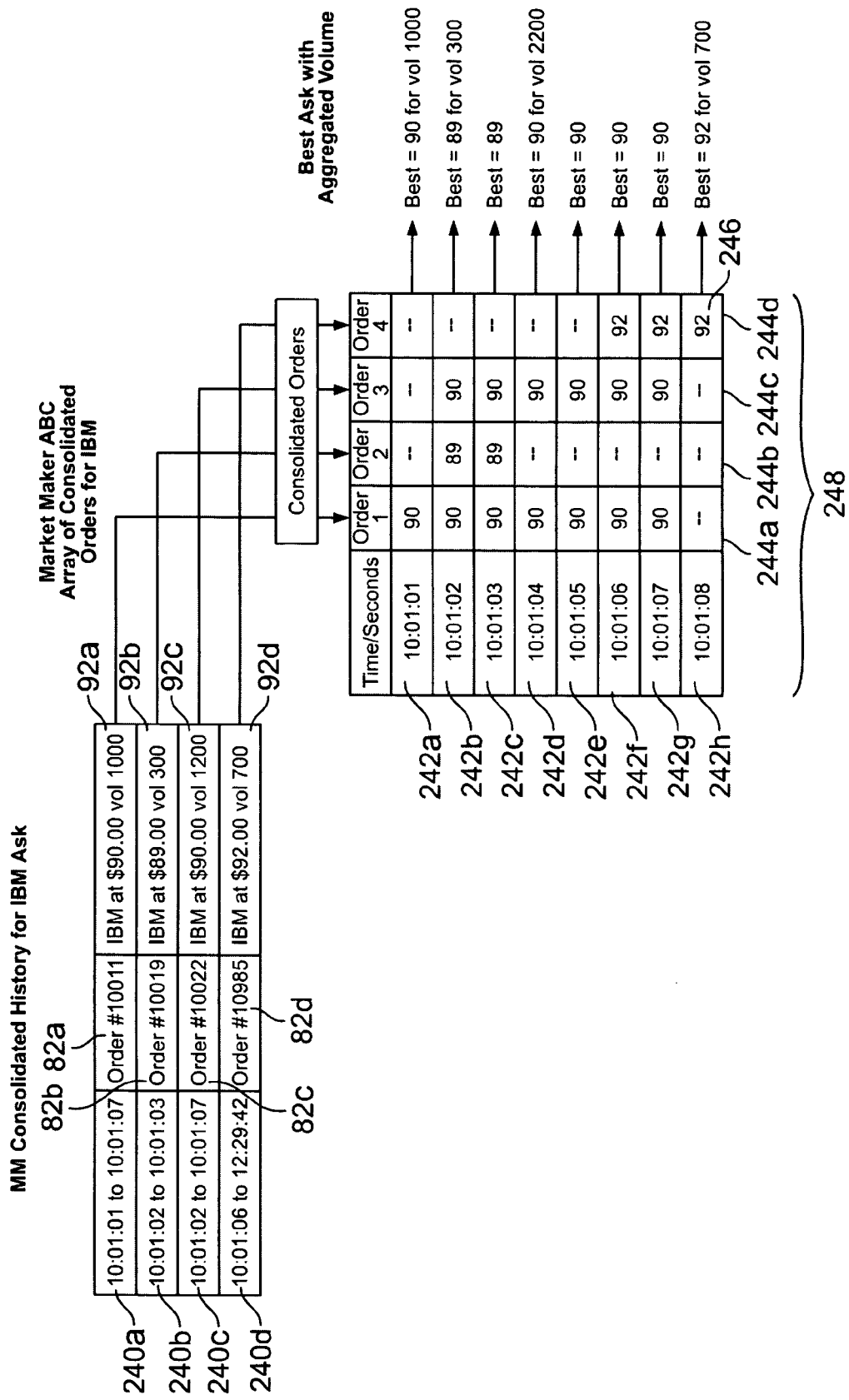
FIG. 12 depicts an exemplary array of consolidated order information.

At steps 212b, 212s, and with reference to FIG. 12, the liquidity engine 32 creates data structures to contain the sorted, validated and consolidated order 92 data for each market maker 40 in a particular security 86 into arrays 248. These arrays 248 ultimately serve as a second-by-second recreation of the market maker's trading day. With reference to FIG. 12, the liquidity engine 32 creates arrays 248 with rows that represent seconds of the trading day 242 and columns that represent each validated order 244 for the given security 86. Where a row 242 and column 244 intersect, a cell 246 is formed. At steps 214b-220b, 214s-220s, the array 248 is populated by the liquidity engine 32. At step 214b, 214s, the liquidity engine 32 reads the first record, and, in step 216b, 216s, uses the start time and end time 94a, 94b to identify the starting point and duration for entering the order 92 into the array 248. The engine 32 locates the row 242 that corresponds to the "start time" for the record and enters the price bid or offered for that order 92 into the appropriate cell 246. This price is entered into every subsequent row 242 in this order's column 244 from the "start time" until the "end time." In other words, the order 92 is represented by a column of prices that begin at the row representing the time the order 92 was initially entered into the system (i.e., the start flag 94a) and that end at the row when the order was ultimately resolved (i.e., the end flag 94b), which may have been when the order was completely filled, the remaining balance of the order was cancelled, etc.

At steps 218b, 218s, the liquidity engine 32 checks to see if the price entered into the newly populated cell 246 matches the price in a cell 246 in another column 244 (i.e., checking whether two or more orders 92 were offered for the same price at the same time). If so, the liquidity engine 32 adds the volumes associated with the orders 92 that occurred at that price and time together and stores this aggregate bid or ask volume. If there is no other order 92 offered at the same price and time, then the liquidity engine 32 stores that order's volume. At steps 220b, 220s, the liquidity engine 32 determines whether there are additional orders to analyze and, if so, moves on to the next order 92. This process continues 214b-220b, 214s-220s until all of the validated orders 92 for the given market maker 40 are entered into the array 248 for the given security 86.

Figure 13:
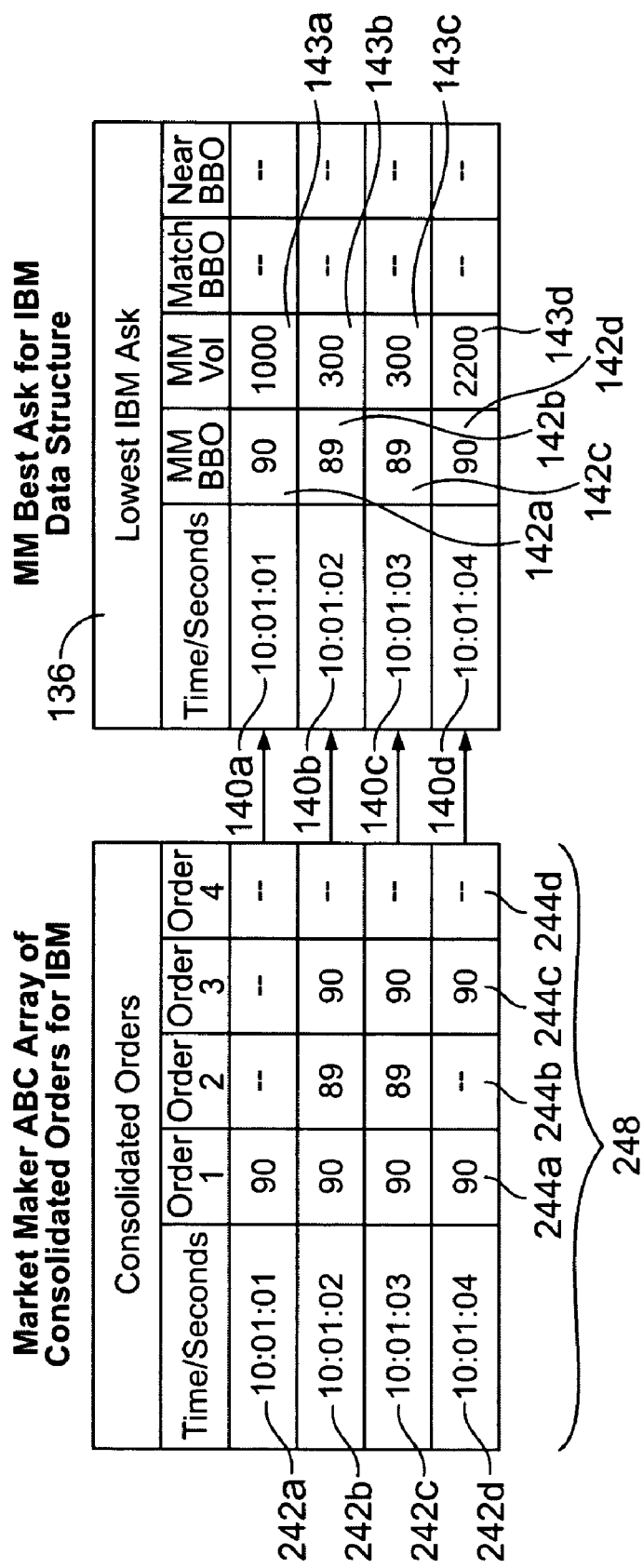
FIG. 13 illustrates an exemplary data structure of consolidated best price data for a specified market maker in a specified financial instrument.

At step 222b, 222s, and with reference to FIG. 13, when there is no further order data to fill the array 248 and the array 248 is finished, the liquidity engine 32 determines, for each second of the day 242, the market maker's highest bid or lowest ask price 142 for a particular security 86 and uses the aggregated total volume as the total shares that were bid or offered at that price 143. At step 224, the engine 32 consolidates the bid (buy) and the ask (sell) structures into a single data structure containing each market maker's best bid and ask price for each second of the day in the given security 86.

Figure 14:
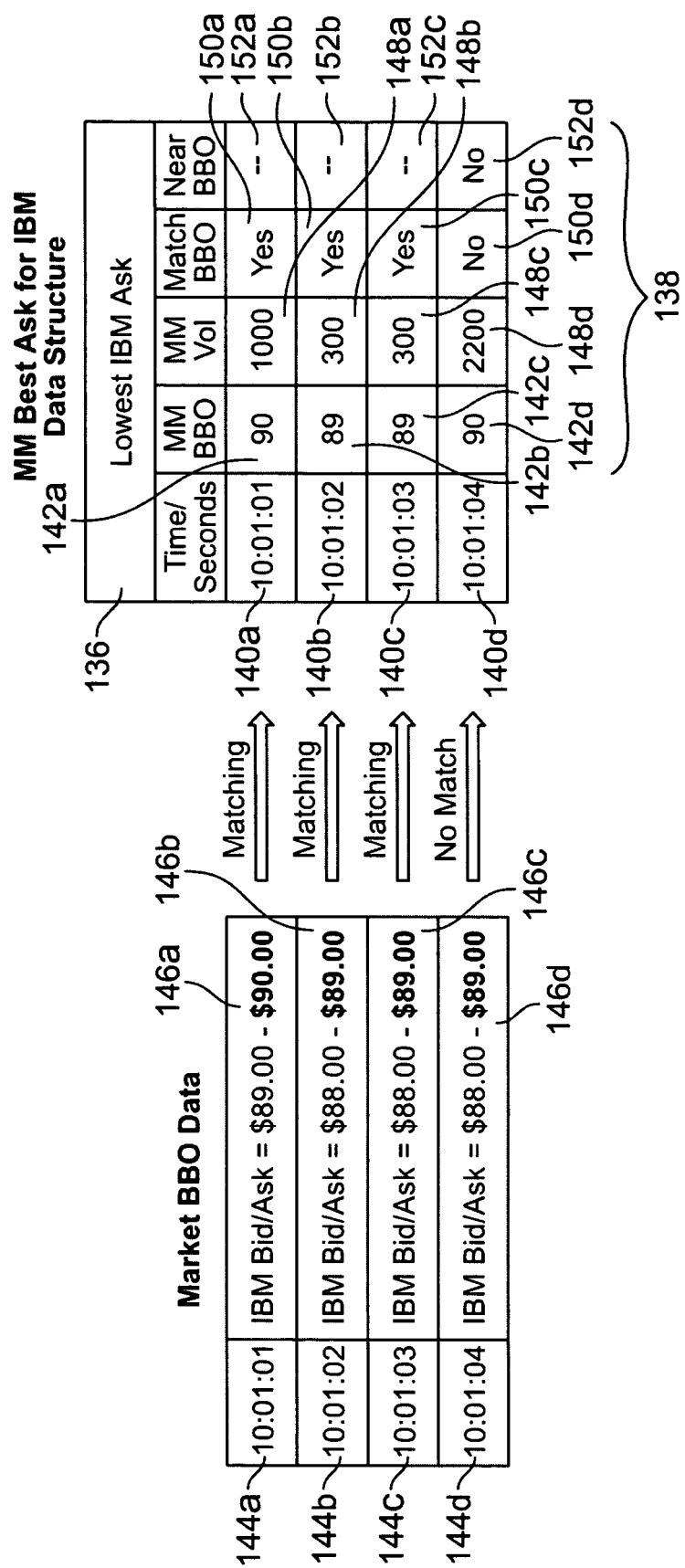
FIG. 14 illustrates exemplary data structures used in comparing a market maker's best price data to market best price data.

At step 226 and referring to FIG. 14, the liquidity engine 32 takes each best bid or ask price 142 for a market maker 40 determined at steps 222b, 222s, and for each bid or ask price retrieves the corresponding market BBO 146 from the BBO data structure 26 for the same one second time period 140, 144. The liquidity engine 32 then compares the market maker's best bid or ask price 142 to the market BBO 146 and records whether the market maker matched, as indicated at 150, or was near, as indicated at 152, the market BBO. In this embodiment, "near" to the market BBO is defined as being within 3 cents of the market BBO price, but any degree or number of comparisons may be implemented. At step 228, the liquidity engine 32 then uses the results of the BBO comparisons, as indicated at 150, 152, to calculate the liquidity generated by the market maker 40 for the specified security 86 during the given trading day, and in step 230 the engine 32 uses this data to generate output.

Referring to FIG. 15, an exemplary market maker liquidity report 260 generated by the liquidity engine 32 of the present invention is illustrated. Such a report 260 is useful in determining how effective any given market maker 40 is in making markets and executing orders. In assessing a market maker 40, it is important to know how often the given market maker 40 is "at the inside market." In other words, the measure of the market maker's ability to generate liquidity is how often the market maker 40 has matched or is very close to the BBO at any given moment throughout the trading day. The report 260 generated by the liquidity engine 32 is a useful tool to measure how long each market maker 40 is at or near the inside market for each security 86. The report 260, in this example, shows, for a given market maker 40 in a given security (e.g., IBM in this example as indicated at 261), the percentage of time either a bid or ask was at the market BBO 262, the percentage of time the bid was at the market BBO 264, the percentage of time the ask was at the market BBO 266, the percentage of time either the bid or ask price was within 3 cents of the market BBO 268, the percentage of time the bid price was within 3 cents of the market BBO 270, the percentage of time the ask price was within 3 cents of the market BBO 272, the aggregate bid size for all bids that were at the market BBO 274 and the aggregate ask size for all asks that were at the market BBO 276. The report 260 can present these statistics for a number of market makers 40 which can be broken out by firm or client type (e.g., agency, proprietary, full service market maker) so the liquidity generated by different market makers 40 can be easily compared to one another. In the example report 260 depicted, generic names are assigned to the firm categories, such as "Full Service 1" and "Full Service 2", so that a market maker's privacy may be maintained. However, if a given market maker 40 wants to advertise their liquidity statistics and have them attributed to their name, it would be possible to show the market maker's name in the report 260.

In other embodiments of the present invention, the liquidity engine 32 may be used to analyze and report on liquidity across market centers or to analyze and report on liquidity generated within a market center by each market participant, because many times market makers may not be the only market participant responsible for generating liquidity in a market center. Sometimes other market participants, such as individual traders, may be responsible for putting a market center at the market best bid or offer price, and market centers, often times, want to know this information.

An example of when market centers want to know liquidity across market centers or want to know which specific market participants are generating liquidity is regarding market data fees (e.g., fees for last sale and quotation data). Market data vendors pay market data fees to get raw real-time market data. Market data vendors take this raw real-time market data and reformat it for publishing or reselling. In many instances, market centers use a central market data facility or organization to collect their market data and distribute it to the market data vendors in a consolidated form. The market data vendors then pay the central market data organization directly for the information and do not deal with the market centers. The fees received by the central market data organization must be proportionately re-distributed back to the market centers. Revenues from market data fees are typically allocated back to the market centers based on the total volume of open interest in a security and the total volume of executed trades generated by market participants at a given market center. Other factors may be incorporated into these volume-based revenue allocation calculations, such as time-weighted and share-weighted adjustments and adjustments for liquidity. Where market center liquidity is used as an adjustment parameter, a market center may receive more market data revenue if their market participants provide the best bid or offer (the "inside market") more often than those at other market centers. Using this type of market data revenue incentive, every market center is encouraged to offer the best possible markets. The liquidity engine 32 of the present invention, by analyzing and reporting on liquidity generated across market centers, may be used in determining the proper revenue adjustment to be paid to each market center due to liquidity. FIG. 16 is an exemplary report that may be generated for this purpose.

In turn, since every market center relies on its market participants to set the markets, market centers may elect to pass some of the market data revenues fees on to the market participants themselves as a financial incentive to continue to create liquid markets. The liquidity engine 32 of the present invention, by analyzing and reporting on liquidity generated by individual market participants, may be used by market centers to implement a financial incentive plan for market participants. FIG. 17 is an exemplary report that may be generated for this purpose.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method for analyzing liquidity, the method comprising:
    monitoring by a computing system at least one trading interest provided by a specific market participant for a specified financial instrument on a securities market, the specified financial instrument having an inside spread;
    analyzing by the computing system the trading interest provided by the specific market participant in the specified financial instrument and determining a best price provided by the specific market participant for the specified financial instrument on the securities market at a first time, wherein the best price is a bid or offer price, is inside or outside the inside spread, and is for a bid or offer that is not executed at the first time;
    determining by the computing system a market best price for the specified financial instrument at the first time, wherein the market best price represents a price of an executed trade;
    comparing by the computing system the best price provided by the specific market participant for the specified financial instrument at the first time to the market best price for the specified financial instrument at the first time, wherein the comparison identifies instances where the best price provided by the specific market participant for the specified financial instrument at the first time is the same as the market best price for the specified financial instrument at the first time, and the comparison also identifies instances where the best price provided by the specific market participant for the specified financial instrument at the first time is not the same as the market best price for the specified financial instrument at the first time;
    recording by the computing system the results of the comparison;
    generating by the computing system liquidity statistics for the specific market participant from the recorded results, said results based on at least two separate comparisons occurring at least at the first time and at a subsequent time, and said liquidity statistics identifying instances where the best price provided by the specific market participant for the specified financial instrument at the first time is the same as the market best price for the specified financial instrument at the first time; and identifying instances where the best price provided by the specific market participant for the specified financial instrument at the first time is not the same as the market best price for the specified financial instrument at the first time; and
    generating by the computing system at least one report from the generated liquidity statistics.

2. The method of claim 1, wherein the specific market participant is a market maker.

3. The method of claim 1, wherein the specific market participant is a trader.

4. The method of claim 1, wherein the specific market participant is a broker.

5. The method of claim 1, wherein the specific market participant is a dealer.

6. The method of claim 1, wherein the specific market participant is a market center.

7. The method of claim 1, wherein the specified financial instrument is a specified stock.

8. The method of claim 1, wherein the at least one generated report contains information on at least one market maker.

9. The method of claim 1, wherein the at least one generated report contains information on:
    how often the at least one market maker was at an inside market for the specified financial instrument and with what aggregated volume; and
    how often the at least one market maker was near the inside market for the specified financial instrument.

10. The method of claim 1, wherein the at least one generated report contains information on at least one market participant.

11. The method of claim 10, wherein the at least one generated report contains information on how often the at least one market participant was at an inside market for the specified financial instrument.

12. The method of claim 11, further comprising using the at least one generated report to reward by the computing system the at least one market participant for providing the inside market for the specified financial instrument.

13. The method of claim 10, wherein the at least one generated report contains information on how often the at least one market participant was near an inside market for the specified financial instrument.

14. The method of claim 1, wherein the at least one generated report contains information on at least one market center.

15. The method of claim 14, wherein the at least one generated report contains information on how often the at least one market center was at an inside market for the specified financial instrument.

16. The method of claim 14, wherein the at least one generated report contains information on how often the at least one market participant was near an inside market for the specified financial instrument.

17. The method of claim 1, wherein the computing system is one or more programmed computers.

18. The method of claim 1, wherein the computing system is distributed over several physical locations.

19. A method for analyzing a market maker's ability to generate buy-side liquidity, the method comprising:
    monitoring by a computing system at least one buy-side trading interest provided by a specific market maker in a specified financial instrument on a securities market, the specified financial instrument having an inside spread;
    analyzing by the computing system the buy-side trading interest provided by the specific market maker in the specified financial instrument and determining a highest bid price provided by the specific market maker for the specified financial instrument on the securities market at a first time, wherein the highest bid price is inside or outside the inside spread and is for a bid that is not executed at the first time;

determining by the computing system the market best bid price for the specified financial instrument at the first time, wherein the market best price represents a price of an executed trade;

comparing by the computing system the highest bid price provided by the specific market maker for the specified financial instrument at the first time to the market best bid price for the specified financial instrument at the first time, wherein the comparison identifies instances where the highest bid price provided by the specific market maker for the specified financial instrument at a first time is the same as the market best bid price for the specified financial instrument at the first time, and the comparison also identifies instances where the highest bid price provided by the specific market maker for the specified financial instrument at a first time is not the same as the market best bid price for the specified financial instrument at the first time;

recording by the computing system the results of the comparison;

generating by the computing system buy side liquidity statistics for the specific market maker from the recorded results, said results based on at least two separate comparisons occurring at least at the first time and at least one subsequent time, and said liquidity statistics identifying instances where the highest bid price provided by the specific market maker for the specified financial instrument at a first time is the same as the market best bid price for the specified financial instrument at the first time, and identifying instances where the highest bid price provided by the specific market maker for the specified financial instrument at a first time is not the same as the market best bid price for the specified financial instrument at the first time; and generating by the computing system at least one report from the generated buy-side liquidity statistics.

20. The method of claim 19, wherein the specified financial instrument is a specified stock.

21. The method of claim 19, wherein the at least one generated report contains information on:

how often a highest bid price provided by the specific market maker for the specified financial instrument was at a market best bid for the specified financial instrument and with what aggregated volume; and how often the highest bid price provided by the specific market maker for the specified financial instrument was near the market best bid for the specified financial instrument.

22. The method of claim 21, further comprising using the at least one generated report to determine whether the highest bid price provided by the specific market maker for the specified financial instrument at a first time is near the market best bid for the specified financial instrument at the first time only if the highest bid price provided by the specific market maker for the specified financial instrument at the first time is within 3¢ of the market best bid for the specified financial instrument at the first time.

23. The method of claim 19, wherein the computing system is one or more programmed computers.

24. The method of claim 19, wherein the computing system is distributed over several physical locations.

25. A method for analyzing a market maker's ability to generate sell-side liquidity, the method comprising:

monitoring by a computing system at least one sell-side trading interest provided by a specific market maker in a specified financial instrument on a securities market, the specified financial instrument having an inside spread;

analyzing by the computing system the sell-side trading interest provided by the specific market maker in the specified financial instrument and determining a lowest offer price provided by the specific market maker for the specified financial instrument on the securities market at a first time, wherein the lowest offer price is inside or outside the inside spread and is for an offer that is not executed at the first time;

determining by the computing system the market best offer price for the specified financial instrument at the first time, wherein the market best price represents a price of an executed trade;

comparing by the computing system the lowest offer price provided by the specific market maker for the specified financial instrument at a first time to the market best offer price for the specified financial instrument at the first time, wherein the comparison identifies instances where the lowest offer price provided by the specific market maker for the specified financial instrument at a first time is the same as the market best offer price for the specified financial instrument at the first time, and the comparison also identifies instances where the lowest offer price provided by the specific market maker for the specified financial instrument at a first time is not the same as the market best offer price for the specified financial instrument at the first time;

recording by the computing system the results of the comparison;

generating by the computing system sell-side liquidity statistics for the specific market maker from the recorded results, said results based on at least two separate comparisons occurring at least at the first time and at least one subsequent time, and said liquidity statistics identifying instances where the lowest offer price provided by the specific market maker for the specified financial instrument at a first time is the same as the market best offer price for the specified financial instrument at the first time, and identifying instances where the lowest offer price provided by the specific market maker for the specified financial instrument at a first time is not the same as the market best offer price for the specified financial instrument at the first time; and generating by the computing system at least one report from the generated sell-side liquidity statistics.

26. The method of claim 25, wherein the specified financial instrument is a specified stock.

27. The method of claim 25, wherein the at least one generated report contains information on:

how often the lowest offer price provided by the specific market maker for the specified financial instrument was at a market best offer for the specified financial instrument and with what aggregated volume; and how often the lowest offer price provided by the specific market maker for the specified financial instrument was near the market best offer for the specified financial instrument.

28. The method of claim 27, further comprising using the at least one generated report to determine whether the lowest offer price provided by the specific market maker for the specified financial instrument at a first time is near the market best offer for the specified financial instrument at the first time only if the lowest offer price provided by the market maker for the specified financial instrument at the first time is within 3¢ of the market best offer for the specified financial instrument at the first time.

29. The method of claim 25, wherein the computing system is one or more programmed computers.

30. The method of claim 25, wherein the computing system is distributed over several physical locations.

31. A method for analyzing liquidity, the method comprising:
retrieving by a computing system trading data of a specific market participant in a specified financial instrument on a securities market, the specified financial instrument having an inside spread;
analyzing by the computing system the trading data of the specific market participant in the specified financial instrument and determining a best price provided by the specific market participant for the specified financial instrument on the securities market at a first time, wherein the best price is a bid or offer price, is inside or outside the inside spread, and is for a bid or offer that is not executed at the first time;
determining by the computing system a market best price for the specified financial instrument at the first time, wherein the market best price represents a price of an executed trade;
comparing by the computing system the best price provided by the specific market participant for the specified financial instrument at the first time to the market best price for the specified financial instrument at the first time, wherein the comparison identifies instances where the best price provided by the specific market participant for the specified financial instrument at the first time is the same as the market best price for the specified financial instrument at the first time, and the comparison also identifies instances where the best price provided by the specific market participant for the specified financial instrument at the first time is not the same as the market best price for the specified financial instrument at the first time;
recording by the computing system the results of the comparison;
generating by the computing system liquidity statistics for the specific market participant from the recorded results, said results based on at least two separate comparisons occurring at least at the first time and at least one subsequent time, and said liquidity statistics identifying instances where the best price provided by the specific market participant for the specified financial instrument at the first time is the same as the market best price for the specified financial instrument at the first time, and identifying instances where the best price provided by the specific market participant for the specified financial instrument at the first time is not the same as the market best price for the specified financial instrument at the first time; and
generating by the computing system at least one report from the generated liquidity statistics.

32. The method of claim 31, wherein, after retrieving the trading data, separating the buy data from the sell data.

33. The method of claim 31, wherein the specific market participant is a market maker.

34. The method of claim 31, wherein the specified financial instrument is a specified stock.

35. The method of claim 31, wherein the trading data includes trading interest records and trading interest records that are related to one another are flagged with an order start time and an order end time.

36. The method of claim 35, wherein related trading interest records are consolidated into a consolidated record.

37. The method of claim 31, wherein the at least one generated report contains information on at least one market maker.

38. The method of claim 37, wherein the at least one generated report contains information on:
how often the best price provided by the at least one market maker for the specified financial instrument at a first time was at an inside market for the specified financial instrument at the first time and with what aggregated volume;
how often the best price provided by the at least one market maker for the specified financial instrument was near the inside market for the specified financial instrument.

39. The method of claim 31, wherein the at least one generated report contains information on at least one market participant.

40. The method of claim 39, wherein the at least one generated report contains information on how often the best price provided by the at least one market participant for the specified financial instrument at a first time was at an inside market for the specified financial instrument at the first time.

41. The method of claim 40, further comprising using the at least one generated report to reward the at least one market participant for providing the inside market for the specified financial instrument.

42. The method of claim 31, wherein the at least one generated report contains information on at least one market center.

43. The method of claim 42, wherein the at least one generated report contains information on how often the best price provided by the at least one market center for the specified financial instrument at a first time was at an inside market for the specified financial instrument at the first time.

44. The method of claim 31, wherein the computing system is one or more programmed computers.

45. The method of claim 31, wherein the computing system is distributed over several physical locations.

46. A market center, comprising:
a market center memory for storing code for analyzing liquidity in the market center;
means for determining a best market price in a specified financial instrument, the specified financial instrument having an inside spread;
a processor for executing the stored code for analyzing market center liquidity, wherein the stored code comprises:
code to monitor at least one trading interest provided by a specific market participant for a specified financial instrument on a securities market;
code to analyze the trading interest provided by the specific market participant in the specified financial instrument and determining a best price provided by the specific market participant for the specified financial instrument on the securities market at a first time, wherein the best price is a bid or offer price, is inside or outside the inside spread, and is for a bid or offer that is not executed at the first time;
code to determine the market best price for the specified financial instrument at the first time, wherein the market best price represents a price of an executed trade;
code to compare the best price provided by the specific market participant for the specified financial instrument at a first time to the market best price for the specified financial instrument at the first time, wherein the comparison identifies instances where the best price provided by the specific market participant for the specified financial instrument at the first time is the same as the market best price for the specified financial instrument at the first time, and the comparison also identifies instances where the best price provided by the specific market participant for the specified financial instrument at the first time is not the same as the market best price for the specified financial instrument at the first time;

code to record the results of the comparison;

code to generate liquidity statistics for the specific market participant from the recorded results, said results based on at least two separate comparisons occurring at least at the first time and at least one subsequent time, and said liquidity statistics identifying instances where the best price provided by the specific market participant for the specified financial instrument at the first time is the same as the market best price for the specified financial instrument at the first time, and identifying instances where the best price provided by the specific market participant for the specified financial instrument at the first time is not the same as the market best price for the specified financial instrument at the first time; and code to generate at least one report from the generated liquidity statistics.

47. A liquidity engine, comprising:

a computing system including at least one processor for executing code stored in at least one memory, wherein the code when executed:

monitors at least one trading interest provided by a specific market participant for a specified financial instrument on a securities market, the specified financial instrument having an inside spread;

analyzes the trading interest provided by the specific market participant in the specified financial instrument and determine a best price provided by the specific market participant for the specified financial instrument on the securities market at a first time, wherein the best price is a bid or offer price, is inside or outside the inside spread, and is for a bid or offer that is not executed at the first time;

determines the market best price for the specified financial instrument at the first time, wherein the market best price represents a price of an executed trade;

compares the best price provided by the specific market participant for the specified financial instrument at a first time to the market best price for the specified financial instrument at the first time, wherein the comparison identifies instances where the best price provided by the specific market participant for the specified financial instrument at the first time is the same as the market best price for the specified financial instrument at the first time, and the comparison also identifies instances where the best price provided by the specific market participant for the specified financial instrument at the first time is not the same as the market best price for the specified financial instrument at the first time;

records the results of the comparison;

generates liquidity statistics for the specific market participant from the recorded results, said results based on at least two separate comparisons occurring at least at the first time and at least one subsequent time, and said liquidity statistics identifying instances where the best price provided by the specific market participant for the specified financial instrument at the first time is the same as the market best price for the specified financial instrument at the first time, and identifying instances where the best price provided by the specific market participant for the specified financial instrument at the first time is not the same as the market best price for the specified financial instrument at the first time; and generates at least one report from the generated liquidity statistics.

48. The liquidity engine of claim 47, wherein the computing system is one or more programmed computers.

49. The liquidity engine of claim 47, wherein the computing system is distributed over several physical locations.

* * * * *